US010695973B2

(12) United States Patent
Boyd, IV

(10) Patent No.: US 10,695,973 B2
(45) Date of Patent: Jun. 30, 2020

(54) ADDITIVE MANUFACTURING OF BUILDINGS AND OTHER STRUCTURES

(71) Applicant: Branch Technology, Inc., Chattanooga, TN (US)

(72) Inventor: R. Platt Boyd, IV, Montgomery, AL (US)

(73) Assignee: BRANCH TECHNOLOGY, INC., Chattanooga, TN (US)

( * ) Notice: Subject to any disclaimer, the term of this patent is extended or adjusted under 35 U.S.C. 154(b) by 0 days.

(21) Appl. No.: 16/360,237

(22) Filed: Mar. 21, 2019

(65) Prior Publication Data

US 2019/0217527 A1 Jul. 18, 2019

Related U.S. Application Data

(63) Continuation of application No. 15/032,791, filed as application No. PCT/US2014/062514 on Oct. 28, 2014, now Pat. No. 10,272,613.

(Continued)

(51) Int. Cl.
*B29C 41/22* (2006.01)
*B29C 64/106* (2017.01)
(Continued)

(52) U.S. Cl.
CPC ............ *B29C 64/106* (2017.08); *B23K 26/00* (2013.01); *B25J 11/00* (2013.01); *B28B 1/001* (2013.01);
(Continued)

(58) Field of Classification Search
CPC ....... B28B 1/001; B28B 1/008; B28B 11/001; B28B 17/0081; B29C 64/118;
(Continued)

(56) References Cited

U.S. PATENT DOCUMENTS 3,252,181 A   5/1966  Hureau
4,115,047 A   9/1978  Stelmack et al.
(Continued)

FOREIGN PATENT DOCUMENTS

AU   2013202686   10/2013
CA      2928832    5/2015
(Continued)

OTHER PUBLICATIONS

Amaral, et al., "Towards a Robust Solution in Building Automation Systems EMS: Supporting Rapid Prototyping and Analysis", 2012 Eighth International Conference on the Quality of Information and Communications Technology, 2012, 4 pages.
(Continued)

*Primary Examiner* — Leo B Tentoni
(74) *Attorney, Agent, or Firm* — Kilpatrick Townsend & Stockton LLP

(57) ABSTRACT

Freeform, additive manufacturing equipment, processes and products, including residential, commercial and other buildings. A movable extruder places extrudate that solidifies in open space to create "scaffolding" or "skeletons" of buildings and other products. Elongated extrudate elements are fused to each other or connected by other means to form a cellular structure. Filler material such as polymeric insulating foam may simultaneously or thereafter be placed within the cellular structure to contribute desired strength, rigidity, insulative, barrier or other properties. Finish materials may also be applied.

42 Claims, 13 Drawing Sheets

Related U.S. Application Data

(60) Provisional application No. 61/897,309, filed on Oct. 30, 2013.

(51) Int. Cl.

| | | |
|---|---|---|
| *B23K 26/00* | (2014.01) | |
| *B29C 67/00* | (2017.01) | |
| *B25J 11/00* | (2006.01) | |
| *B29C 64/20* | (2017.01) | |
| *B29C 64/386* | (2017.01) | |
| *B32B 5/02* | (2006.01) | |
| *B32B 5/18* | (2006.01) | |
| *B32B 13/00* | (2006.01) | |
| *B32B 27/00* | (2006.01) | |
| *B32B 27/20* | (2006.01) | |
| *B32B 27/30* | (2006.01) | |
| *B32B 27/38* | (2006.01) | |
| *B32B 1/00* | (2006.01) | |
| *B32B 3/12* | (2006.01) | |
| *E04C 5/07* | (2006.01) | |
| *B63B 71/00* | (2020.01) | |
| *B29D 99/00* | (2010.01) | |
| *B28B 1/00* | (2006.01) | |
| *B28B 11/00* | (2006.01) | |
| *B29C 64/118* | (2017.01) | |
| *B28B 17/00* | (2006.01) | |
| *B33Y 10/00* | (2015.01) | |
| *B33Y 30/00* | (2015.01) | |
| *B33Y 80/00* | (2015.01) | |
| *B23K 101/02* | (2006.01) | |
| *B23K 101/04* | (2006.01) | |
| *E04B 1/35* | (2006.01) | |
| *E04G 21/04* | (2006.01) | |
| *B29L 31/00* | (2006.01) | |
| *B29L 31/60* | (2006.01) | |
| *B33Y 50/02* | (2015.01) | |

(52) U.S. Cl.
CPC ............ *B28B 1/008* (2013.01); *B28B 11/001* (2013.01); *B28B 17/0081* (2013.01); *B29C 64/118* (2017.08); *B29C 64/20* (2017.08); *B29C 64/386* (2017.08); *B29C 67/00* (2013.01); *B29D 99/001* (2013.01); *B29D 99/0014* (2013.01); *B29D 99/0017* (2013.01); *B29D 99/0021* (2013.01); *B29D 99/0089* (2013.01); *B32B 1/00* (2013.01); *B32B 3/12* (2013.01); *B32B 5/02* (2013.01); *B32B 5/18* (2013.01); *B32B 13/00* (2013.01); *B32B 27/00* (2013.01); *B32B 27/20* (2013.01); *B32B 27/302* (2013.01); *B32B 27/38* (2013.01); *B33Y 10/00* (2014.12); *B33Y 30/00* (2014.12); *B33Y 80/00* (2014.12); *B63B 71/00* (2020.01); *E04C 5/07* (2013.01); *B23K 2101/02* (2018.08); *B23K 2101/045* (2018.08); *B29L 2031/60* (2013.01); *B29L 2031/601* (2013.01); *B29L 2031/602* (2013.01); *B29L 2031/608* (2013.01); *B29L 2031/776* (2013.01); *B32B 2262/02* (2013.01); *B32B 2262/101* (2013.01); *B32B 2262/105* (2013.01); *B32B 2262/106* (2013.01); *B32B 2307/304* (2013.01); *B32B 2307/7265* (2013.01); *B32B 2419/00* (2013.01); *B32B 2607/00* (2013.01); *B33Y 50/02* (2014.12); *E04B 1/3505* (2013.01); *E04G 21/0418* (2013.01); *Y10T 428/24149* (2015.01)

(58) Field of Classification Search
CPC ... B29C 64/386; B29C 64/393; B29D 99/001; B29D 99/0014; B29D 99/0017; B29D 99/0021; B29D 99/0089; B29L 2031/60; B29L 2031/601; B29L 2031/602; B29L 2031/608; B29L 2031/776; B32B 3/12; E04B 1/3505
USPC .......... 264/31, 34, 35, 40.1, 40.6, 40.7, 255, 264/256, 308
See application file for complete search history.

(56) References Cited

U.S. PATENT DOCUMENTS

| | | |
|---|---|---|
| 4,369,153 A | 1/1983 | Nash et al. |
| 4,593,449 A | 6/1986 | Meray-Hovarth et al. |
| 4,636,419 A | 1/1987 | Madsen |
| 4,732,723 A | 3/1988 | Madsen et al. |
| 5,217,771 A | 6/1993 | Schmanski et al. |
| 5,266,021 A | 11/1993 | Jacobson et al. |
| 5,886,702 A | 3/1999 | Migdal et al. |
| 6,035,583 A | 3/2000 | Papke |
| 6,214,279 B1 | 4/2001 | Liu et al. |
| 6,630,221 B1 | 10/2003 | Wong |
| 6,682,684 B1 | 1/2004 | Jamalabad et al. |
| 6,730,252 B1* | 5/2004 | Teoh .................. A61L 27/18 264/178 F |
| 6,936,212 B1 | 8/2005 | Crawford et al. |
| 7,087,200 B2 | 8/2006 | Taboas et al. |
| 7,153,454 B2 | 12/2006 | Khoshnevis et al. |
| 7,424,967 B2 | 9/2008 | Ervin et al. |
| 7,628,600 B2 | 12/2009 | Perret et al. |
| 8,113,807 B2 | 2/2012 | Wilkinson et al. |
| 8,155,775 B2 | 4/2012 | Batchelder |
| 8,166,727 B2 | 5/2012 | Pivac et al. |
| 8,185,240 B2 | 5/2012 | Williams et al. |
| 8,186,990 B2 | 5/2012 | Perret et al. |
| 8,337,736 B2 | 12/2012 | Dini |
| 8,889,243 B2 | 11/2014 | Hanschen et al. |
| 2002/0014051 A1 | 2/2002 | Fraval et al. |
| 2002/0125592 A1* | 9/2002 | Schulman .......... A61C 13/0003 264/308 X |
| 2004/0244344 A1 | 12/2004 | Ichikawa |
| 2005/0072113 A1 | 4/2005 | Collins et al. |
| 2007/0138678 A1 | 6/2007 | Khoshnevis |
| 2007/0160820 A1 | 7/2007 | Waters |
| 2008/0128956 A1 | 6/2008 | Perret et al. |
| 2008/0148683 A1 | 6/2008 | Dini et al. |
| 2010/0086721 A1 | 4/2010 | Batchelder |
| 2013/0037984 A1 | 2/2013 | Arnauts |
| 2013/0101746 A1 | 4/2013 | Keremes et al. |
| 2014/0302110 A1* | 10/2014 | Choi .................. A61K 41/00 424/423 |
| 2015/0165690 A1* | 6/2015 | Tow .................. B29C 64/386 700/119 |
| 2015/0182811 A1* | 7/2015 | Bender ................ B29C 64/118 473/376 |
| 2016/0263822 A1 | 9/2016 | Boyd, IV |
| 2017/0217088 A1 | 8/2017 | Boyd, IV et al. |

FOREIGN PATENT DOCUMENTS

| | | |
|---|---|---|
| DE | 102005062406 | 6/2007 |
| DE | 202006019940 | 9/2007 |
| DE | 102007063561 | 7/2009 |
| EP | 3063341 | 9/2016 |
| WO | 2004083540 | 9/2004 |
| WO | 2005057436 | 6/2005 |
| WO | 2010019051 | 2/2010 |
| WO | 2011021080 | 2/2011 |

(56) References Cited

FOREIGN PATENT DOCUMENTS

| WO | 2015034438 | 3/2015 |
| WO | 2015065936 | 5/2015 |

OTHER PUBLICATIONS

Ceccanti, et al., "3D Printing Technology for a Moon Outpost Exploiting Lunar Soil", 61st International Astronautical Congress 2010, vol. 11, 2010, 9 pages.

Craveiro, et al., "Functionally Graded Structures Through Building Manufacturing", Advanced Materials and Engineering Materials II, vol. 683, 2013, pp. 775-778, 13 pages.

De Grassi, et al., "Development of an Automatic Four-Color Spraying Device Carried by a Robot Arm", Automation and Robotics in Construction—Proceedings of the 24th International Symposium on Automation and Robotics in Construction, 2007, 6 pages.

Gramazio Kohler Research, "Mesh Mould", http://gramaziokohler.arch.ethz.ch/web/e/forschung/221.html, 2012-2016, 2 pages.

Griffith, et al., "Computing & Materializing Non-Uniform Shapes: An Evolutionary Approach to Generate and Digital Fabricate Non-Uniform Masonry Walls", CAADRIA 2006—The Association for Computer-Aided Architectural Design Research in Asia: Rhythm and Harmony in Digital Space, 2006, 9 pages.

Gu, et al., "3D Hierarchically Parametric Design Method for Cast-in-Place Concrete Structures", Journal of Computer Aided Design & Computer Graphics (Dec. 2010), vol. 22, No. 12, Dec. 2010, pp. 2147-2154, Translation included, 21 pages.

Khoshnevis, "Automated construction—Future Prospects", IIE Annual Conference and Exhibition 2004, 2004, pp. 3419-3430.

Khoshnevis, "Extending RP to Large Scale Fabrication—Automated house construction", IIE Annual Conference and Exhibition 2004, 2004, pp. 723.

Ko, et al., "Development of Automatic Reinforcement Bar Placement for RC Walls Based on Structural Building Information Modeling (S-BIM)", Manufacture Engineering, Quality and Production Systems em II, Advanced Materials Research, vol. 711, 2013, pp. 623-628.

Lim, et al., "Developments in Construction-Scale Additive Manufacturing Processes", Automation in Construction, vol. 21, No. 1, Jan. 2012, pp. 262-268.

Moum, et al., "What Did You Learn From Practice Today? Exploring Experiences from a Danish R&D Effort in Digital Construction", Advanced Engineering Informatics, vol. 23, No. 3, Jul. 2009, pp. 229-242.

PCT/US2014/062514, "International Preliminary Report on Patentability", dated May 12, 2016, 7 pages.

PCT/US2014/062514, "International Search Report and Written Opinion", dated Mar. 4, 2015, 9 pages.

Pottmann, et al., "Geometry of Multi-Layer Freeform Structures for Architecture", ACM SIGGRAPH 2007 Papers—International Conference on Computer Graphics and Interactive Techniques (2007), arn: 65, 2007, 11 pages.

Rael, et al., "Developing concrete polymer building components for 3D printing", Integration Through Computation—Proceedings of the 31st Annual Conference of the Association for Computer Aided Design in Architecture, 2011, pp. 152-157.

Reed, "3D Printing in the Architectural-Engineering-Construction Market", RAPID 2011 and 3D Imaging Conferences and Exposition, vol. TP11PUB21, 2011, pp. 1-7.

Ruan, et al., "Direct three-dimensional layer metal deposition", Journal of Manufacturing Science and Engineering, Transactions of the ASME (2010), vol. 132, No. 6, arn: 064502,, Nov. 1, 2010, 6 pages.

Sass, "Synthesis of Design Production with Integrated Digital Fabrication", Automation in Construction,vol. 16, No. 3,, May 2007, pp. 298-310.

Song, et al., "Development of a BIM-Based Structural Framework Optimization and Simulation Systems for Building Construction", Computers in Industry, vol. 63, No. 9, Dec. 2012, pp. 895-912.

Villalon, et al., "Breaking Down Brick Walls: Design, Construction, and Prototype Fabrication Knowledge in Architecture", Proceedings of the 27th International Conference Extended Abstracts on Human Factors in Computing Systems EMS, CHI 2009, 2009, pp. 4261-4266.

Zhang, et al., "Optimal machine operation planning for construction by Contour Crafting", Automation in Construction, vol. 29, Jan. 2013, pp. 50-67.

Zhou, et al., "Discussion of the Construction Design Methodology Considering Both Evolutionary Structural Optimization and 3d Printing Technology", Applied Mechanics and Materials I, vol. 275-277, 2013, pp. 2616-2619.

Mesh Mould, Gramazio Kohler Research, Dec. 12, 2016, 2 pages.

European Application No. EP14859196.9, Communication pursuant to Rule 114(2) EPC dated Dec. 21, 2016, 4 pages.

Hack, Overcoming Repetition: Robotic fabrication processes at a large scale, international journal of architectural computing, vol. 3, Issue. 11, 2013, 16 pages.

European Application No. 14859196.9, Extended European Search Report dated Mar. 22, 2017, 7 pages.

European Application No. EP14859196.9, "Office Action", dated Aug. 8, 2019, 4 pages.

\* cited by examiner

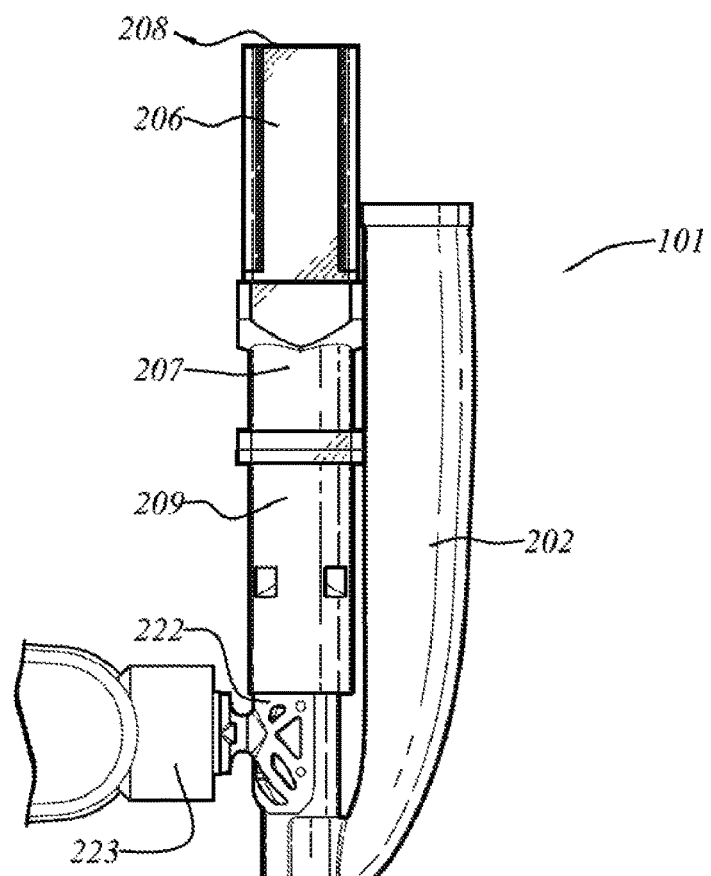
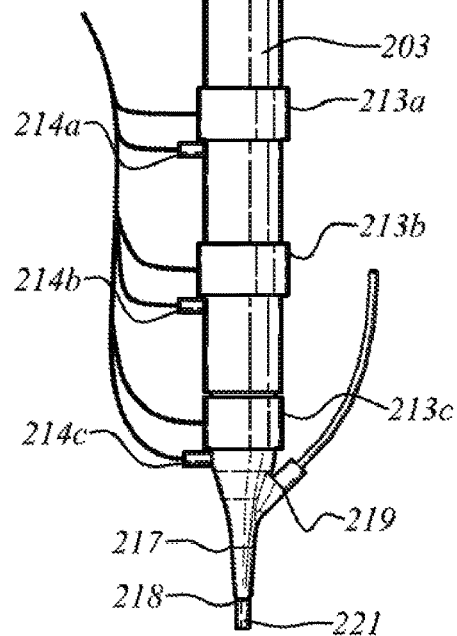
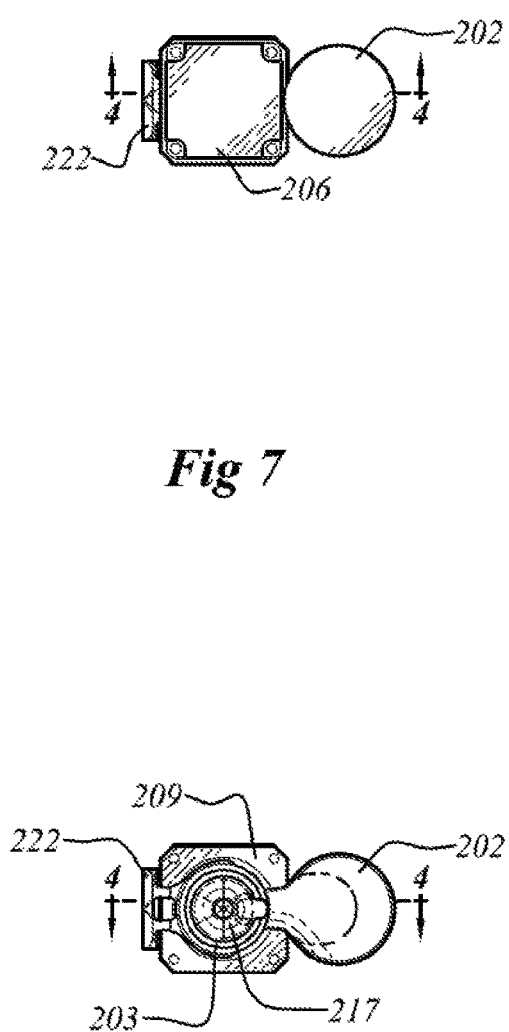
Fig 6
Fig 7
Fig 8

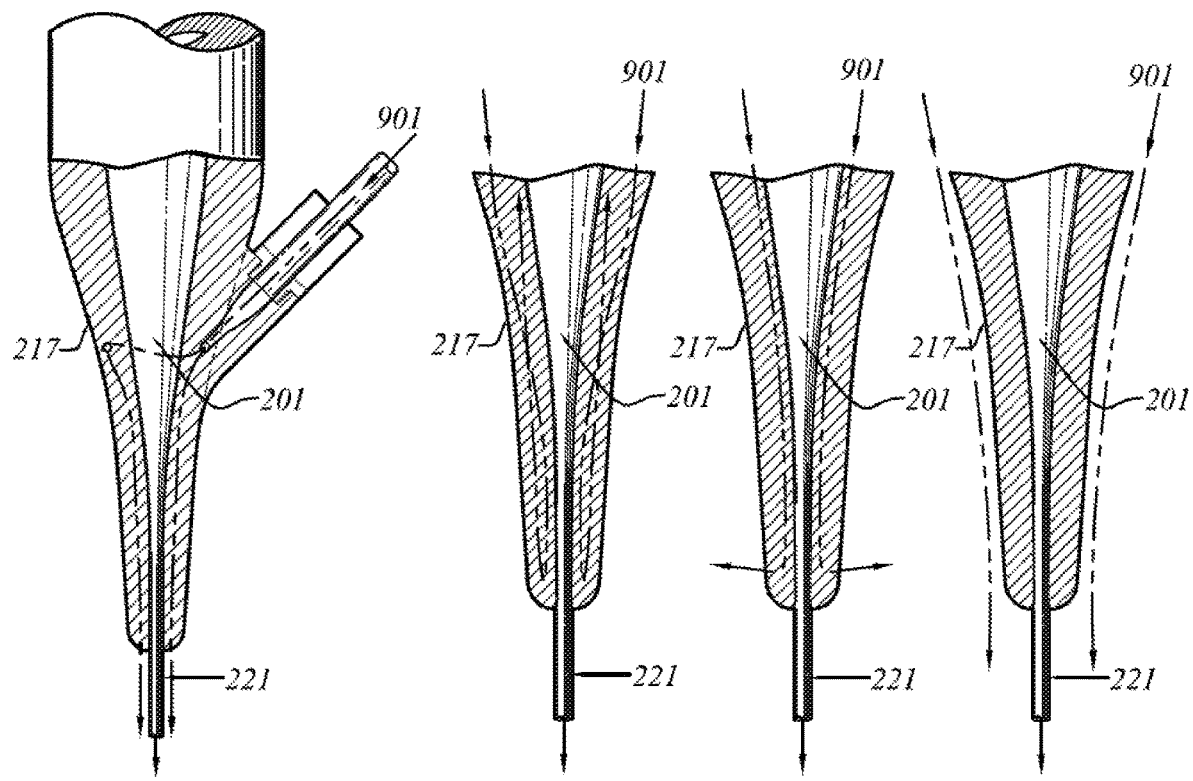
*Fig 9*    *Fig 10*    *Fig 11*    *Fig 12*
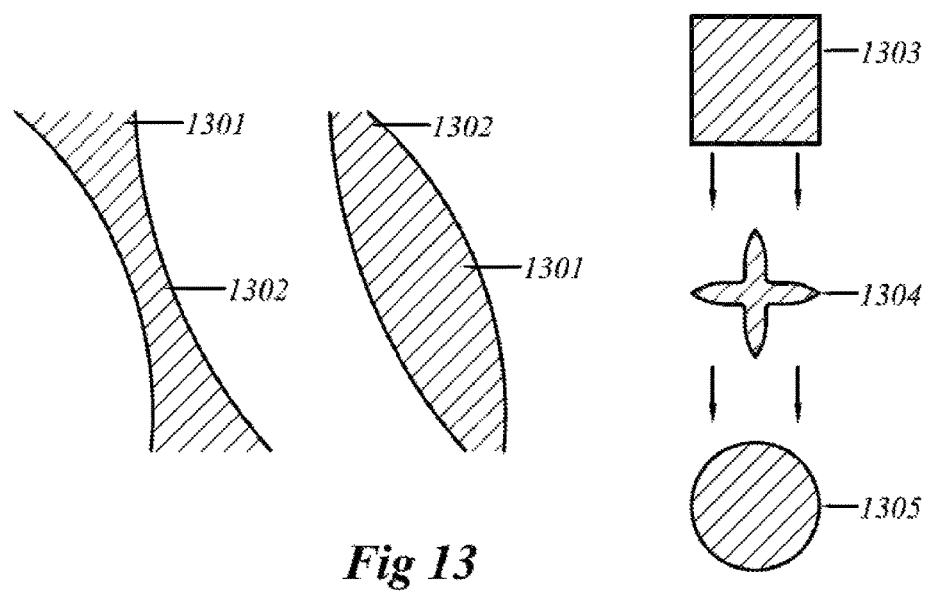
*Fig 13*

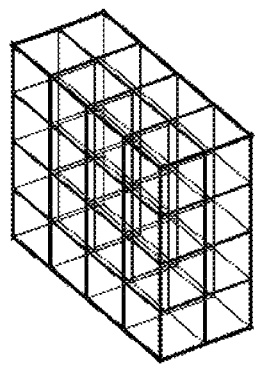 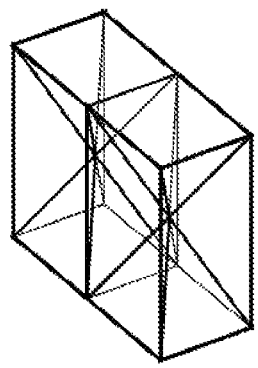 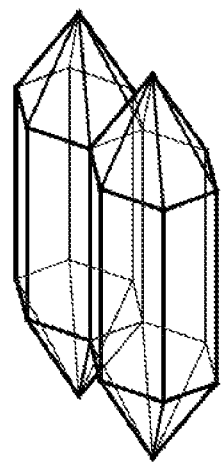
*Fig 25*   *Fig 26*   *Fig 27*
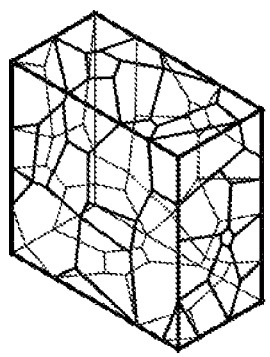 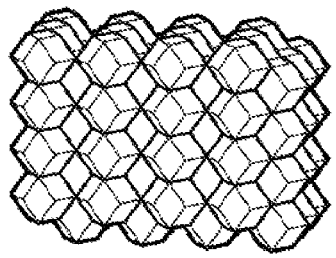 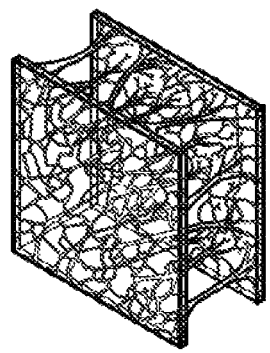
*Fig 28*   *Fig 29*   *Fig 30*

ADDITIVE MANUFACTURING OF BUILDINGS AND OTHER STRUCTURES

CROSS-REFERENCE TO RELATED APPLICATIONS

This is a continuation of U.S. Nonprovisional application Ser. No. 15/032,791, filed Apr. 28, 2016, now issued as U.S. Pat. No. 10,272,613, which is a National Stage of International Application No. PCT/US2014/062514, filed Oct. 28, 2014, which claims the benefit of priority to U.S. Provisional Application No. 61/897,309, filed on Oct. 30, 2013. The entire contents of all of these applications are incorporated by this reference.

FIELD OF THE INVENTION

This invention relates to additive manufacturing, manufacturing equipment and products, including the design and production of buildings and other structures of all kinds.

BACKGROUND

Additive manufacturing has been in use for some time whereby objects are built up with small layers of various materials over time. Among others, methods of additive manufacturing include fused deposition modeling, selective laser sintering, and stereolithography to form these layers. All of these methods create an object by "slicing" the virtual object into layers that are then deposited one on top of the other until the final object is formed.

Typical methods for forming a structure include the addition of preformed objects together in sequence to form a larger building or other object. Buildings have been constructed using systems of materials that combine to form a composite assembly having many beneficial characteristics such as structural support, insulation, water resistance, and finished surfaces.

The conventional construction of objects or buildings involves materials that are cast, cut, machined, or extruded in various forms and are then combined together to form the final object or building. Many components are cut or customized in the field by removing material from the piece to fit it into the assembly. Within a typical building the shape of a beam or wall is calculated to resist its maximum load and then the entire beam or wall is of uniform shape and depth to account for the maximum load. This method of designing and constructing buildings has been in use since the first buildings were constructed. By contrast, in a natural system, material is at a premium and therefore the shape of an object is optimized for minimal use of the material. Current construction practice largely ignores nature's example. Building elements are designed for speed of manufacture and building erection; largely without consideration of material efficiency or flexibility of form. Customized shapes or structures are expensive and therefore rarely used in current construction practice.

Additive manufacturing techniques are currently in very limited use to produce large structures.

For instance, a toy used for freeform additive manufacturing uses plastic filament that is melted and pushed through a heated nozzle to extrude in open space. It is useful only as a toy without much control over the temperature, rate of extrusion, or feedstock material.

Metallic freeform sintering is also in use for a process called Direct Metal Deposition (DMD) whereby particles of metal are ejected from a nozzle while a high powered laser fuses the particles to the previously built up substrate while being controlled by a robotic arm.

One larger scale example involves use of brick-like modular plastic parts produced with a scaled up, layered Fused Deposition Modeling (FDM) approach. These units are then combined with other parts to form a larger building. Another method is adopts a similar approach with modular clay bricks that are 3D printed with an extruder mounted on a robotic arm.

At least two other methods utilize large gantry cranes to deposit material. One produces a building through layered deposition of cement with a gantry crane mechanism that is larger than the building being built. Another approach produces a large structure through the use of powdered stone material laid down in layers with a polymeric binder.

Another method attaches a plastic extruder to a robotic arm and is used to produce tension elements similar to cocoons or spider webs over a metal framework. Another similar effort uses a mechanism with a filament extruder on the end of a robotic armature to produce single material concrete walls where the mesh acts as "leaking formwork" and the extrusions act as horizontal wall ties between the faces of the wall.

Existing 3D printing technology produces objects that are built up in a layered format through different means and materials, but are limited to small build volumes and a layer-wise buildup of material. Most examples exclusively use the 3D printed material to construct a structure and are constrained to the build volume of the printing mechanism employed.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim. The headings herein are provided for ease of reference and likewise are not intended to identify key or essential features and are not intended to limit the scope of the claimed subject matter.

This invention relates to an apparatus and process of freeform additive manufacturing to create structures that are used as a scaffold onto which other materials are applied. It includes an extruder that positions or deposits solidified or soon to be solidified material in open space to create objects by connecting points to create pathways with a movement mechanism. As used here, the terms "construction" and "structure" and related terms are used in their broadest senses, ranging between the construction of a molecular structure up through the fabrication of building, ship and airliner structures.

Aspects of this invention replicate the manner in which natural structural systems are formed on a cellular basis and filled with other materials by providing apparatus and methods to construct structures similar in theory to natural formation by using cost effective materials and methods.

Major Objective

One of the major objectives of this apparatus and process is to create structures at various scales in an efficient manner. This enables the construction of buildings in a manner more creative and efficient than conventional methods. These can be applied to smaller and larger scale structures, because the apparatus and method are scale agnostic.

In one embodiment of this apparatus, an extruder is attached to a movement mechanism that moves the extruder (or a nozzle attached to the extruder) between points to create freeform extruded pathways in order to fabricate a cellular matrix acting as a scaffold onto which additional materials may be applied.

Extruder

An extruder heats material to make it fluid, or mixes or otherwise handles materials that are at least transitorily fluid, dispensing the fluid from a nozzle in a controlled manner that, upon exit from the nozzle, rapidly solidifies to become a segment within a cellular matrix. The extruder may use various means such as heating, mixing, or airflow to control the solidification process or it can be otherwise controlled, for instance, through use of chemical compositions that solidify through molecular crosslinking, catalysis or other mechanisms.

Movement Mechanism

While the extruder is operating and material is dispensing from the nozzle, die or other structure, the nozzle is moved from point to point to create freeform "pathways" or elements of extrudate. Ideally the speed of extrusion and the speed of motion are synchronized. One method of moving the nozzle is using a multi-axis industrial robot.

Cellular Matrix

A "cellular matrix," as used here, is a larger object made up of modular connected volumes where some portion of those volumes are bounded by connected segments of extrudate. This is similar to a 3D diagram or other representation of plant or animal cells or the chemical structures of minerals or fluids. The simplest versions are like three-dimensional trusses, spanning in all directions rather than in a single plane. Additional examples of cellular matrices occurring in nature include honeycomb, crystalline, plants, bone, foam, spiders web, voronoi diagram or tessellation structures, and human cells.

Minimum Solution

By contrast with other methods of fabrication using extrusion, in one aspect this invention seeks to conserve time and materials. The fundamental objective is not maximum use of a material or process, but rather use of as little material as possible to produce a particular structure.

While the techniques, structures and materials of this invention may be used to create solid or maximum structures, it is advantageous to produce structures using minimal amounts of a given material. For instance, the objective may be to design and produce a structure that is optimized for strength but is reasonably economical in using the least amount of material possible to provide the necessary strength and other beneficial characteristics. On the other hand, a "maximum" could be conceptualized as a solid or constant depth structure that is not optimized for its loading conditions. Where other methods seek to use their method to create maximum structures, one useful approach with this invention seeks to pursue optimized minimum structures.

In these methods of construction, the space between the pathways is filled with other materials. These other materials may have (and typically will have) entirely different characteristics than the materials of the pathways. These other materials may become an exterior shell, interior structure, insulating medium, conducting medium, air space, or other advantageous use of the space.

Because of the modular nature of a cellular matrix structure where each module does not have to be the same, more design flexibility is possible, enabling production of different structures and structures with different components and functions. A naturally-occurring analogy is provided by a tree; the same basic cell makes up the entire structure, but there are no two trees that are exactly the same. Because of the freeform nature of the pathways it is possible to fabricate structures that would be impossible or too costly to produce with normal construction methods.

This enables architectural design for freeform buildings and other structures, when traditional building methods would be impossible or prohibitively expensive. More specifically, this approach enables greater design flexibility and the creation of freeform structures not otherwise possible using conventional beam or sheet products. Aspects of this invention permit design and construction of structures akin to natural structures seen in the human body, animals, insects, plants, or mineral formations.

Elements of this invention may be used either on a job site or in a factory setting. These methods are mostly additive rather than subtractive in nature, allowing materials to be deposited where needed for the beneficial characteristics of structure or form, but where materials are not needed the method may be material efficient.

Process

The practice of this invention may begin with a designed object or structure, typically using a CAD program. A given cellular matrix pattern is applied to the volume of the object or walls of the structure. The design of this cellular matrix takes into account the depths of the materials to be applied and the application methods. This matrix is then translated to a sequential path for constructing each segment with the extruder and movement mechanism, that may be controlled using robotic code. This process moves the end of the extruder along the prescribed pathways to create the extruded segments of the cellular matrix. At each joint with the extrudate or another substrate, the heat of the extrudate (or another appropriate mechanism) fuses or otherwise connects or bonds the extrudate to create a solid joint. With this method the overall form of the structure is created as a scaffold onto which other materials are added. The composite structure is created by adding, curing and finishing other materials.

Materials

The cellular matrix may be useful on its own, but a much stronger composite assembly may be created by the addition of other materials that conform to and fill some or all of the open spaces in the matrix, in some instances forming an integral bond with the cellular matrix material(s). In one example of building construction, spray foam insulation, concrete, and gypsum materials are used to fill the cellular matrix. Layers within the added materials may be created by the addition of barriers within the cellular matrix. For instance, spray foam can be blown into the matrix from the interior side of the wall with a septum layer that prevents the liquid foam from significantly penetrating further into the wall assembly. This allows spray foam to rise in one direction to a certain depth for a desired R-value. Multiple septum layers may also be incorporated for various purposes.

The material used in the extruder may be almost any material that can be heated and cooled to become a solid or that can otherwise be extruded in fluid form and later solidify. Some of the possible materials include thermoplastic, thermoset, metallic, organic, or other materials, including materials that may be pulverized and recombined with a binder. Most materials commonly used in extrusion may be used. For instance, acrylonitrile butadiene styrene ("ABS") plastic resin may be fed into the extruder in pellet form. ABS plastic in filament form may also be used. The addition of a structurally enhancing fiber within the melt may also be used such as a glass, ceramic, carbon or other fiber that is continuous or separately mixed into the ABS resin compound.

Extruder

One version of an extruder of this disclosure processes plastic resin with an extrusion screw driven by a motor. Plastic pellets are fed into a barrel where they are pulverized and melted through friction and external heat sources to a controlled temperature. Once the plastic is fluid it may pass through a nozzle assembly where it is regulated and formed into a certain shape. Just prior to exit and/or upon exit from the nozzle, heat is removed from the extrudate so that it solidifies in open space. Heat may be removed through various means, including, without limitation, air flow within or surrounding the nozzle and after the extrudate reaches the nozzle orifice. Another heat removal method may include the circulation of a heat transfer fluid, either or both of liquid or gas, including fluids that change phase during use.

It is typically desirable for the temperature of the extrudate to be high enough for the extrudate to fuse to other parts while also allowing the extrudate to solidify in open space without additional support. Typically the extrudate is produced in sufficient quantity and shape to be self-supporting from a fused joint to a point where changes of direction or attachment by fusion to another extrudate segment is accomplished.

Alternative extrudate-to-extrudate attachment methods are also possible, including, for instance, chemical, mechanical or other bonding or attachment.

Aspects of this invention provide an apparatus and method that uses materials efficiently to quickly produce buildings and other structures with optimal structural performance and great capacity for customization.

BRIEF DESCRIPTION OF THE DRAWINGS

Illustrative embodiments of the present invention are described in detail below with reference to the following drawing figures:

FIG. 6 is a view of the front of the extruder shown in FIG. 2.

FIG. 7 is a top view of the extruder shown in FIG. 2.

FIG. 8 is a bottom view of the extruder shown in FIG. 2.

FIGS. 9-12 depict nozzle heat transfer variations.

FIG. 13 depicts alternative extrudate shapes.

FIGS. 25-30 are schematic depictions of exemplary cellular structures of various embodiments of this invention.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Extruder

Figure 1:
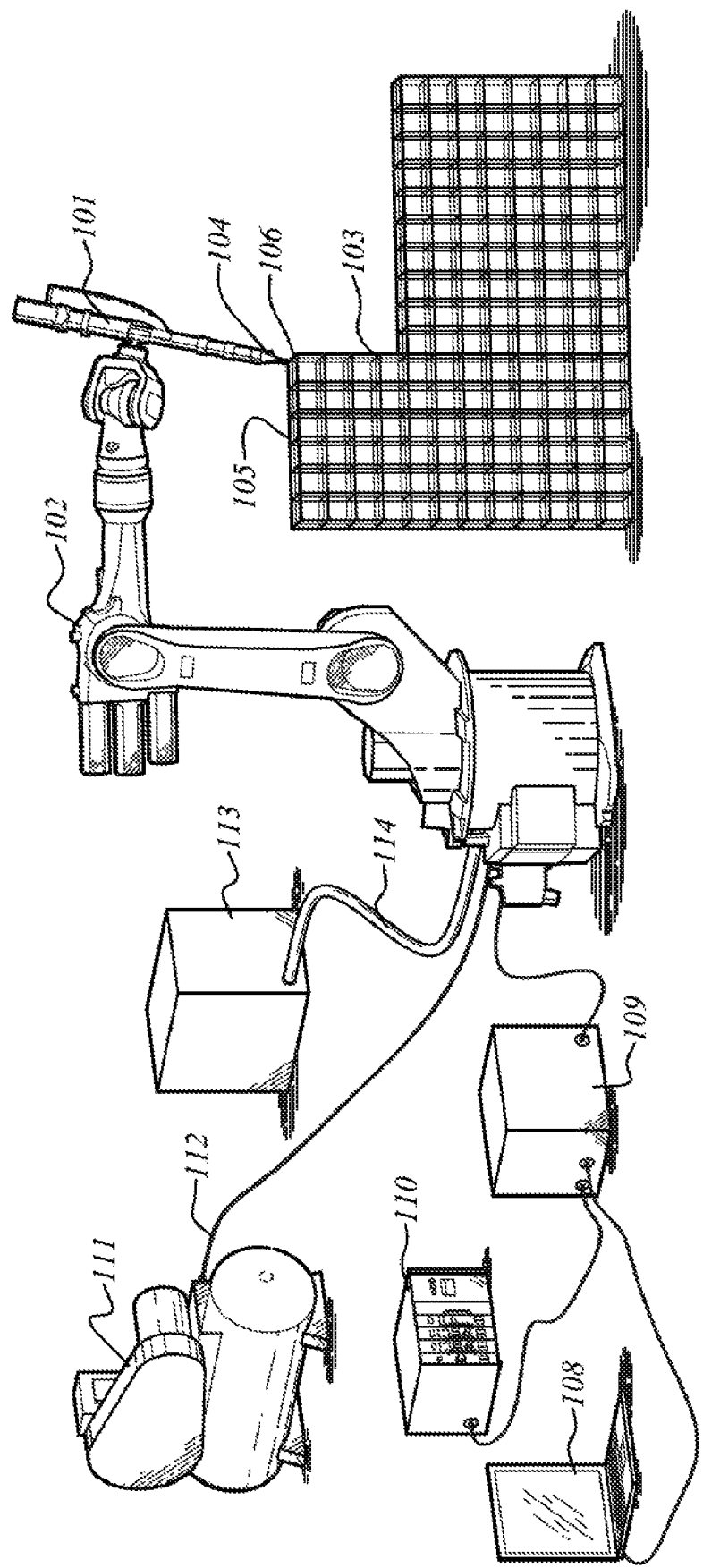
FIG. 1 is a perspective view of one embodiment of this invention.
Figure 2:
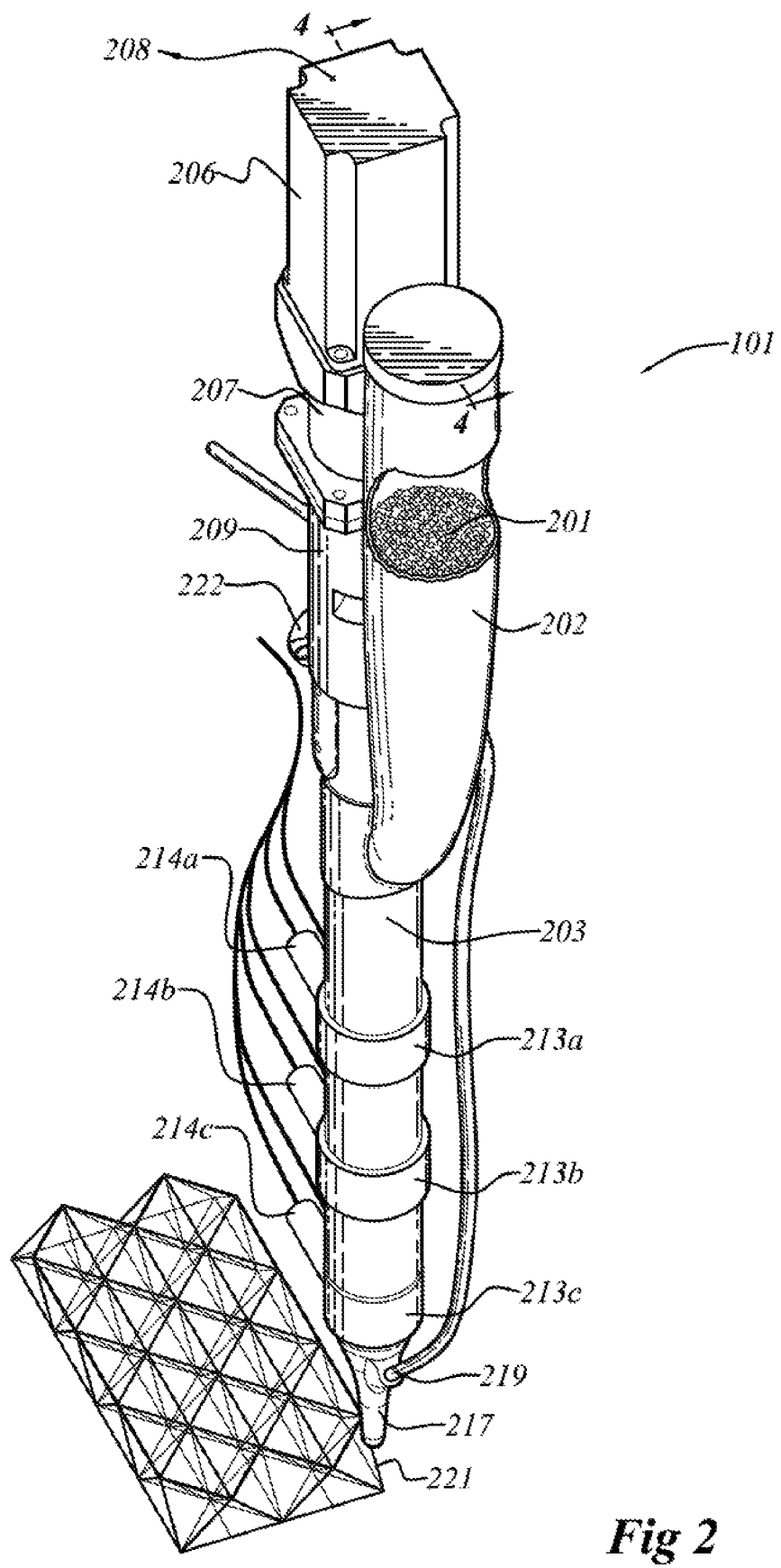
FIG. 2 is axonometric view of an exemplary extruder mechanism of this invention.
Figure 3:
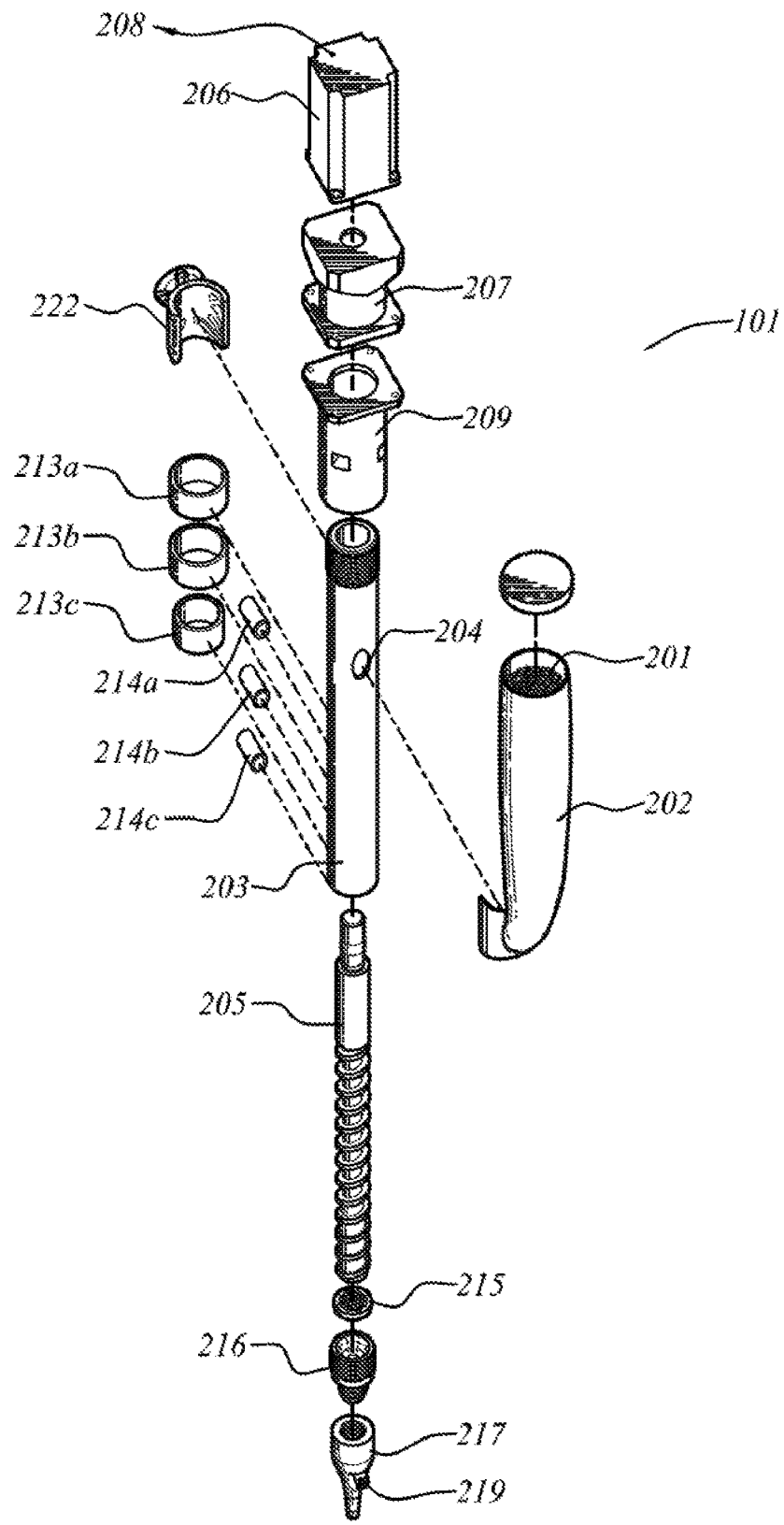
FIG. 3 is an exploded axonometric of the extruder mechanism shown in FIG. 2.
Figure 4:
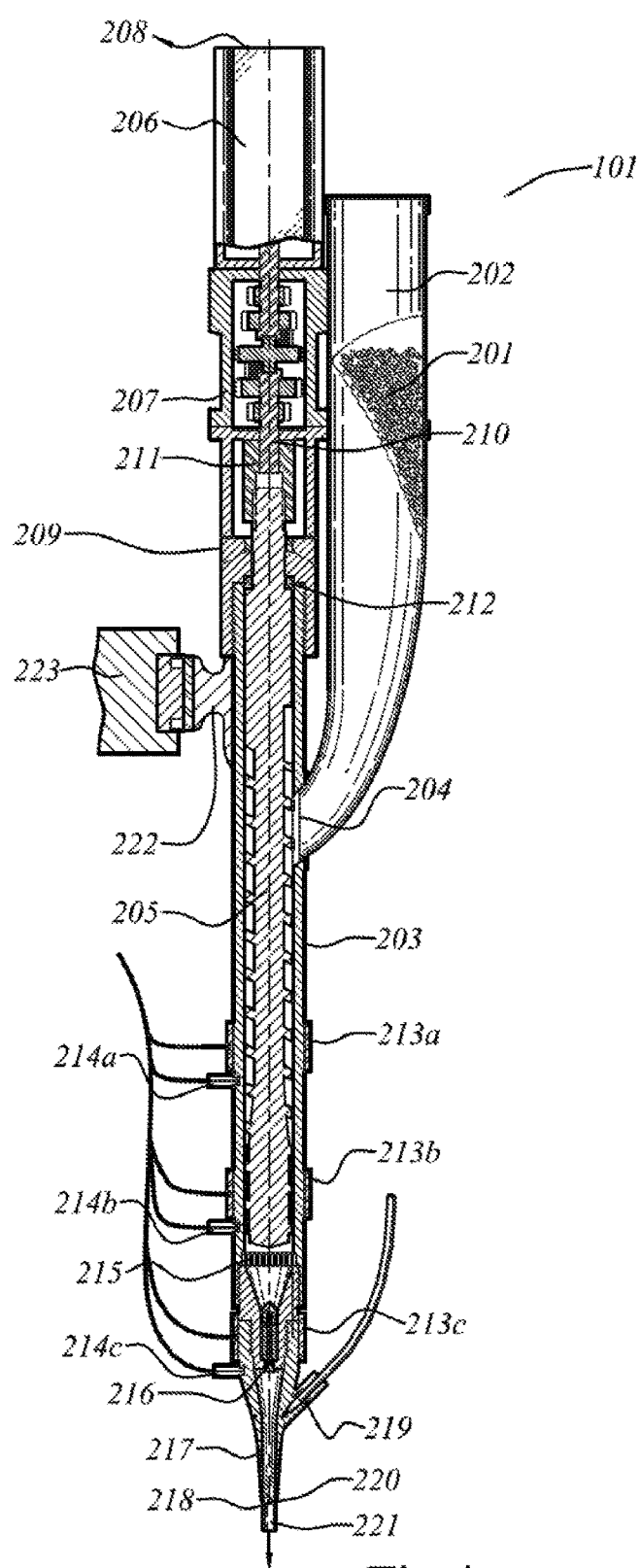
FIG. 4 is a section through the long axis of the extruder shown in FIG. 2.
Figure 5:
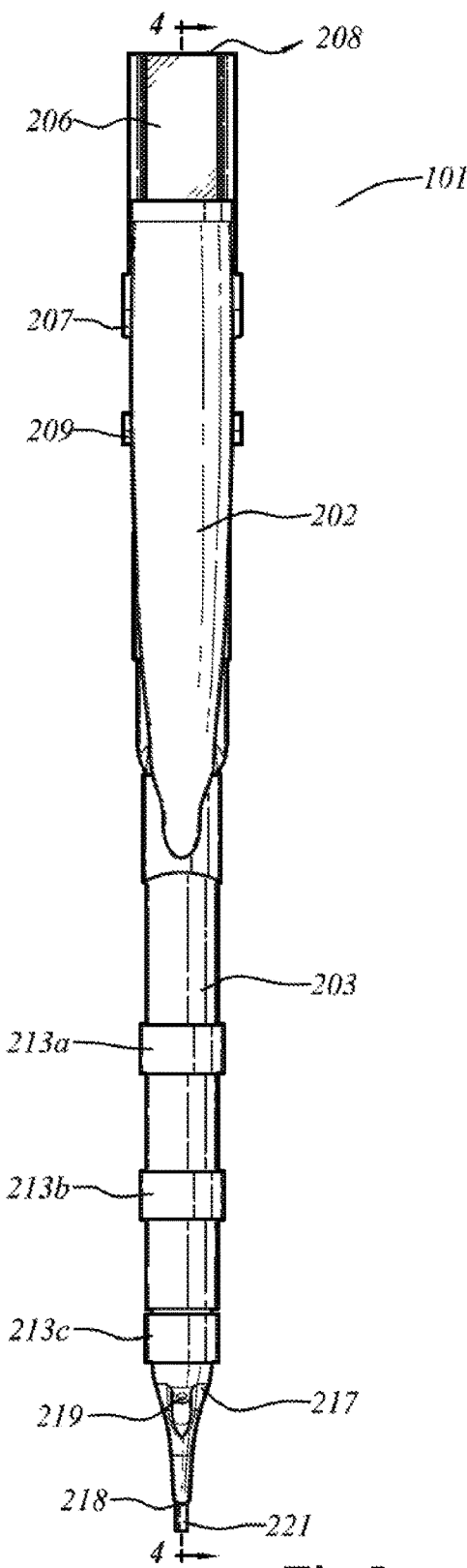
FIG. 5 is a view of one side of the extruder-shown in FIG. 2.

In one embodiment of this invention, depicted in FIG. 1, an extruder assembly 101 is manipulated by a robotic armature system 102 to fabricate a structure 103. The nozzle end 104 of extruder assembly 101 is moved along a pathway 105 while material is dispensed from the orifice 106 of the nozzle 104 at a controlled rate. Once the material exits the orifice 106 it is rapidly cooled by air jets that harden the extrudate to a solid that can be formed without support for a given segment length. As the extruder 101 dispenses material, the motion of the extruder through space at a controlled speed is coordinated with the extrusion rate such that material is dispensed along a pathway in a controlled manner. The rate of deposition may be faster or slower than the induced motion to create varying effects. The motion is programmed or controlled via computer 108 that is coupled to a controller 109 that controls the motion of the robot 102. Temperature is controlled by a thermostatic temperature controller 110 attached to the heating elements of the extruder 101. Air pressure and air movement are supplied by an air compressor 111 fed to the extruder via a hose 112. Material is fed to the extruder mechanism 101 from a supply source 113 via a material feed system 114.

As illustrated in FIGS. 2-8, an exemplary extruder 101 holds material 201 in pellet form temporarily in a hopper 202 that feeds the material into the barrel 203 of the extruder through an opening 204. Within the barrel 203 a screw 205 rotates to pulverize, partially melt, and dispense the material. The screw is preferably designed for the particular extrusion process in use. The rotation of the screw is driven by a motor assembly 206 that may include a gear assembly 207 to control the motor speed and a motor controller 208 to regulate the speed of the motor 206.

The motor 206 may be mounted to the thrust bearing assembly 209 with the motor drive shaft 210 connected to the screw by a coupling 211. The thrust bearing assembly contains means to resist the thrust of the screw with a rotational thrust bearing 212.

As the material is pushed along by the extrusion screw, heat is applied to facilitate the melting process by various means, such as resistance heater bands 213 mounted around the extruder at various locations. Other methods to add heat may include other resistance heat methods such as cartridge heaters, or coil heaters. Other methods such as heated air, heated fluids, vibratory, ultrasonic, infrared, direct current interaction or lasers may be used. Temperature may be monitored by thermocouples 214 and controlled thermostatically at each heater band 213.

A breaker plate 215 with holes in a variety of patterns may be used to generate back pressure in the barrel and ensure a consistent mixture in the extrudate. A shutoff valve 216 may be employed that controls the flow of the extrudate. Valve 216 may work in coordination with the pressures induced by the rotation of the screw 205 to open and close a spring loaded opening mechanism, or it may be controlled in other manners, such as pneumatically.

An extruder may be monitored as to location, temperature, flow rate and otherwise with great precision, enabling manipulation of the extruder and control of the extrudate it produces with similarly great precision. For instance, a pressure transducer may be used to monitor internal pressure within the barrel. Temperature sensors within the barrel and or within the melt may be used to precisely control the temperature of the material.

Nozzle

The nozzle 217 (sometimes called a "die") forms the shape of the material and dispenses it from an orifice 218. The heat may be removed from the material by means of air flow 219 cooling through and out of the nozzle 217 through opening 220 so that the air flows around extradate 221. The air may also be used to remove heat within the nozzle without flowing onto the extrudate 221.

FIGS. 9-12 depict structures that use other fluids that may also recirculate out of the nozzles and that may include supplementary heating and cooling systems. These fluid passageways may be internal or external to the nozzles.

FIG. 9 illustrates a system where a fluid 901 is introduced into the nozzle 217 that circulates around the material 201 while it is moving through the nozzle 217. This fluid then exits nozzle 217 and flows over the extrudate 221. The fluid may either be a liquid or a gas.

FIG. 10 employs a similar fluid as FIG. 9 except the fluid 901 re-circulates and does not flow over the extrudate 221. FIG. 11 illustrates a similar approach as FIGS. 9 and 10 but the fluid 901 exits the nozzle and does not flow directly onto the extrudate 221. FIG. 12 illustrates a similar approach as FIG. 9 except that the fluid 901 circulates external to the nozzle and does not flow within the nozzle proper. The fluid 901 may circulate around the nozzle and flow onto the extrudate 221.

Motor speed, valve operation, temperature control, and heat removal may all be controlled and operated in coordination with each other or may be controlled separately.

The shape of the extrudate 221 may be adjusted by various methods, either by changing nozzles, dynamically adjusting the shape of the extrudate 221, or changing the rate of motion causing the material to accumulate or stretch as shown in FIG. 13. The shape of the extrudate may be modulated to be thicker 1301 or thinner 1302 in certain areas or the cross section may be changed from one shape 1303 to another shape 1304 or 1305.

Figure 14:
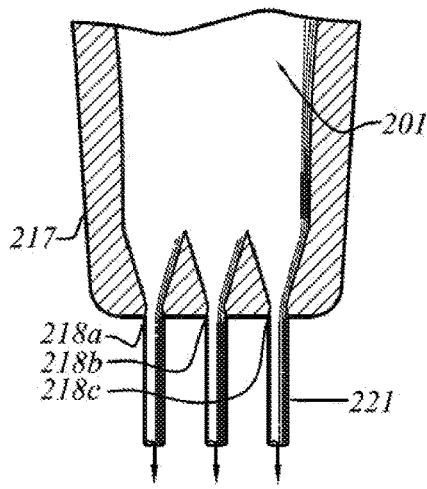
FIG. 14 depicts a nozzle with multiple orifices.
Figure 15:
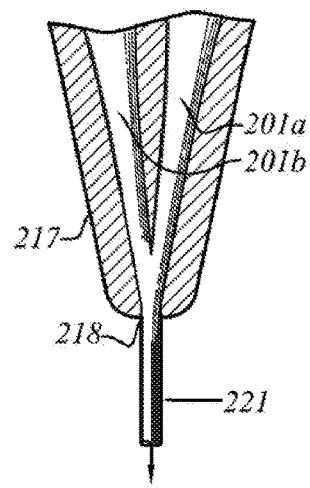
FIG. 15 depicts a nozzle with multiple material sources.
Figure 16:
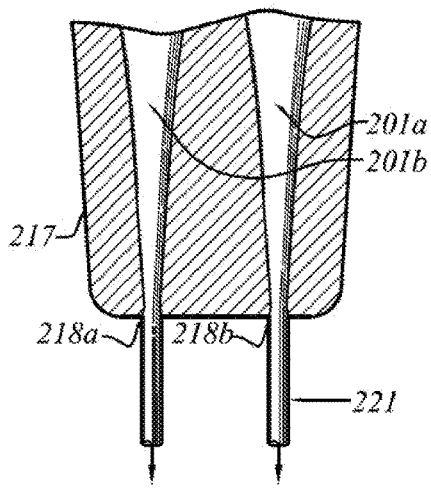
FIG. 16 depicts a nozzle with multiple orifices supplied from multiple materials sources.

FIGS. 14, 15 and 16 depict nozzle variations, including nozzles that dispenses extrudate from multiple holes simultaneously, nozzles that dispenses extrudate from two components and or at different times in a connected or disconnected manner. FIG. 14 illustrates a nozzle 217 with multiple orifices 218 extruding from one material source 201. FIG. 15 illustrates a nozzle 217 with one orifice 218 combining multiple material sources 201a and 201b that may be mixed prior to exit from orifice 218 or extrude in a laminated format. FIG. 16 illustrates a nozzle 217 with multiple orifices 218a and 218b that are supplied from multiple materials sources 201a and 201b that may be controlled together or separately.

Filament

Figure 17:
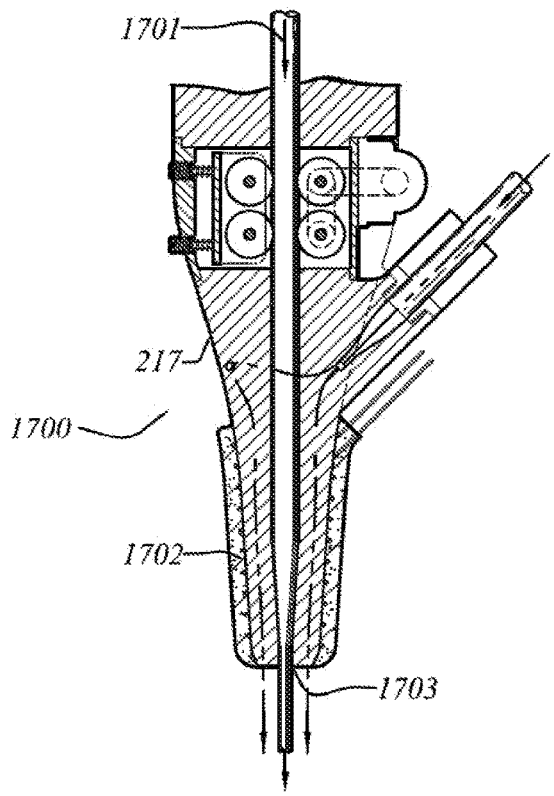
FIG. 17 depicts an exemplary nozzle showing feedstock in filament form.

FIG. 17 depicts an alternative extruder assembly 1700 that operates similarly to a common 3D printer whereby filament 1701 is fed into a heating chamber 1702, is melted, and extruded from the nozzle 1703. The nozzle 1703 would work similarly to the description of nozzles in FIGS. 9-12, except that the material from which the extrudate is formed is initially in filament form rather than pellet form.

Materials

Among many other existing and yet-to-be-developed materials, ABS plastic resin becomes fluid within a range of temperatures but in a controlled manner depending on the desired result. ABS with a fibrous or other additive may be used to change certain properties of the extrudate. Various other thermoplastics may be utilized to achieve similar results.

Any other materials may be used that can be extruded through an orifice and then rapidly solidify. Some of these may be thermoplastic, thermoset, epoxies, wax, polymer, metallic, foam, organic, cementitious, ceramic, biological, or other existing and later-developed materials. Some such materials are fluids above certain temperatures and rapidly solidify when their temperature drops.

Other usable materials may solidify as a result of chemical processes such as two-part materials, like some epoxies that crosslink and solidify after the two parts are combined, or other materials that crosslink after introduction of a catalyst, or exposure to moisture or ultraviolet light. Some such materials bond to themselves, at least when contact occurs above certain temperatures or before chain linking or other chemical reactions have fully occurred. Other materials systems may utilize a structural extrudate and a separately supplied bonding material or agent dispensed at the points of contact of the structural extrudate, such as a cyanoacrylate or other fast-acting adhesive.

Figure 18:
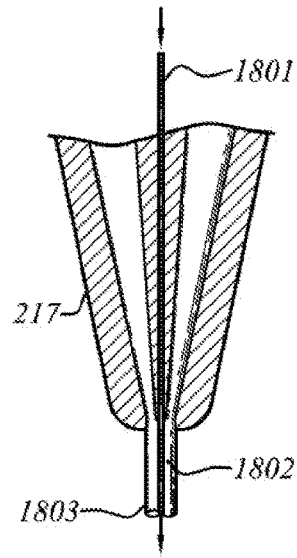
FIG. 18 depict a nozzle that extrudes materials together with a fiber.

One method of reinforcing the extrudate is through the addition of a continuous or broken strand(s) of fiber reinforcing. Common materials used for this may include glass fiber, ceramic fiber, metallic wire, or carbon fiber strands. As depicted in FIG. 18, the fiber 1801 is incorporated into the melt 1802 such that the melt may encapsulate the fiber 1801 strand to reinforce each segment of the cellular matrix fabricated from the fiber 1801 and melt 1802 extrudate 1803.

Other existing and future extrusion techniques may also be employed to combine materials or enhance extrusion, including use of a mandrel or air or other fluid or by, for instance, utilization of bladed sheet flow or blown film extrusion techniques.

Motion

Extruder nozzle motion may be accomplished in any way that places the nozzle where it needs to be at a particular time. In one embodiment, as generally depicted in FIG. 1, extruder and nozzle movement is provided by a multiple axis industrial robot 102. The extruder 101 is attached to the robot 102 by means of a bracket assembly 222 shown in FIGS. 2, 3, 4 and 6 that which mounts to the end of the armature 223 shown in FIGS. 4 and 6.

The robot 102 is programmatically controlled by a computer 108 to execute the motion necessary to create the desired cellular matrix pathways. One method for producing this motion is by drawing the cellular matrix in a CAD program that is then translated into a sequential motion process. to control the robot 102. This motion is programmed to include information that coordinates the extrusion speed, temperature control, cooling mechanism and other parameters for extrusion.

Figure 19:
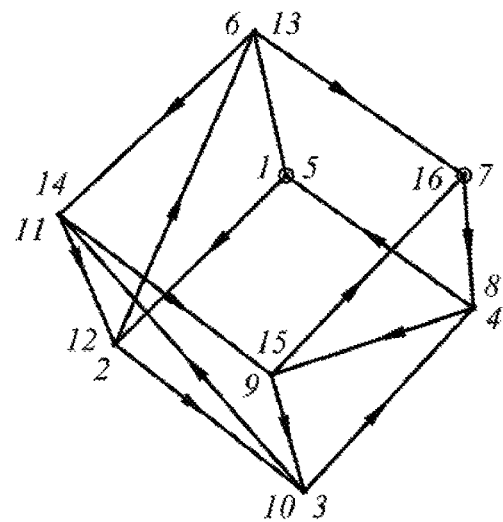
FIG. 19 is an exemplary isometric view of segments in accordance with this invention.
Figure 20:
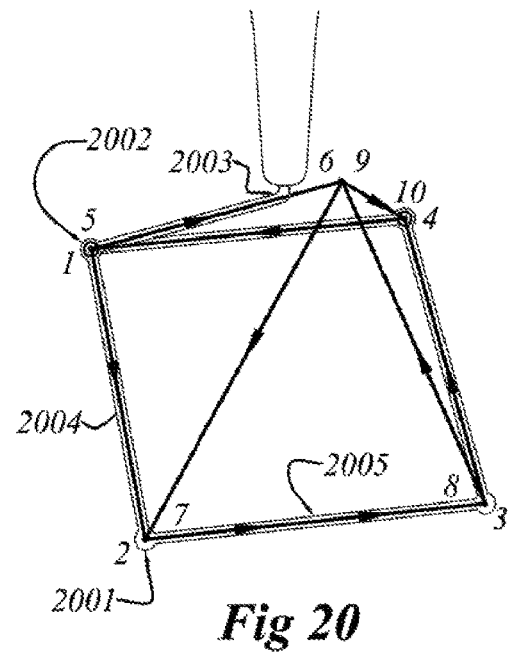
FIG. 20 is an isometric view of exemplary robot movement.

Such a basic motion control program allows the movement mechanism to move from one point to another point along a prescribed path at a certain speed as shown by reference to exemplary three dimensional shapes in FIGS. 19 and 20. While the robot 102 is executing such movement of the extruder 101 and attached nozzle 217, the extruder motor 208 may also be activated at a prescribed speed, a material shutoff valve 216 may be opened, temperature of various portions of the apparatus and the material may be monitored and heating or cooling mechanism(s) may be turned on or off as appropriate. The motion of the robot may pause to create (as shown in FIG. 20) a node 2001 or joint 2002 built up with the extrudate 2003. The cooling or heating systems may turn off or on to modulate solidity in the extrudate 2003 viscosity or other flow characteristics. Motor 206 speed may also be changed to increase or decrease the extrudate flow out of the extruder 101. The rate of extrusion, rate of motion, heat transfer, cooling, heating and fusing are coordinated to produce a solid filament of desired shape and size along the prescribed pathway bonded to other filaments or other structures where desired.

Sequence

As shown in FIGS. 19 and 20 the program sequence and resulting nozzle movement allows material to be added that connects to previously deposited material at joints without passing back through previously applied material. This programming determines the overall shape of the final structure along with all the interconnected sequential segments forming a part of it.

Segments

Each of these segments such as segments 2004 and 2005 in FIG. 20 may be derived by breaking down the cellular matrix into pathways such as the path 2-3 and the joint 1, 5. Each pathway is assigned characteristics such as speed of extrusion, speed of motion, temperature, and cooling. These characteristics determine how elements such as segments 2004 and 2005 and the resulting structure comprised by those elements will be built up. Once a region of the cellular matrix (like the cells depicted in FIGS. 19 and 20) is complete, additional material is added to build up the structure in a horizontal and/or vertical manner by the addition of more cells.

Range Programming

Figure 21:
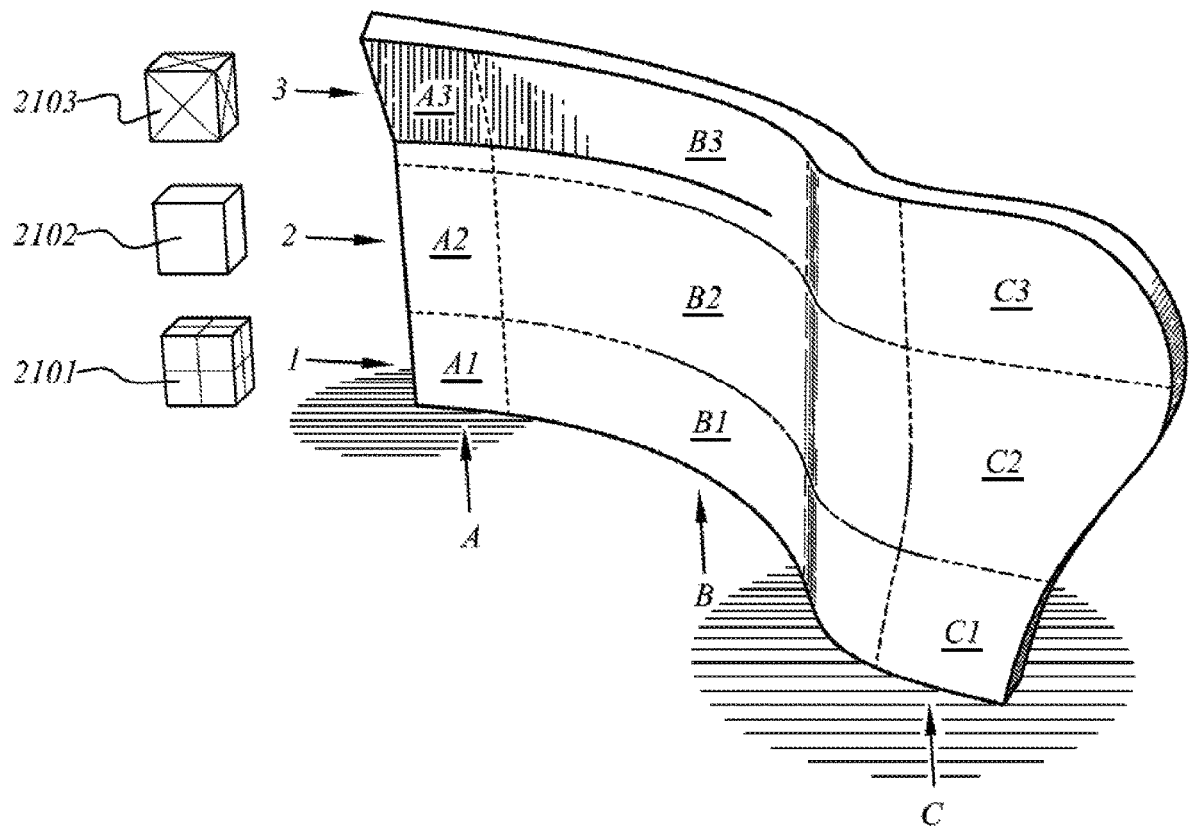
FIG. 21 is an isometric view of an exemplary wall illustrating programming ranges of patterns within a wall.

Another method of building up the cellular matrix in lieu of discreet pathway programming is illustrated in FIG. 21. In this technique, certain patterns of material deposition 2101, 2102, or 2103 are applied to similarly structured volumes of space. The program may dictate the application of a certain cellular pattern over a particular range without having to program each discreet motion step. In this manner, a structure may be divided into ranges that would inform the pattern formation by the robot and the motion programming may be substantially simplified.

The example wall illustrated in FIG. 21 has certain physical characteristics and internal stresses as a result of its design. The application of the cellular matrix and resulting motion control programming may be algorithmically automated to respond to the geometry and stresses within the wall by allocating certain patterns of formation 2201, 2202, or 2203 to certain ranges within the wall. In an area of higher stress, geometry 2101 may be applied to range A1, but in an area of lower stress, geometry 2102 may be applied to range B2. This method of algorithmically responding to the necessary requirements of a given wall area may significantly simplify the programming and reduce material use by optimizing the internal structure for the stresses needed to be resisted.

Feedback Sensors

To ensure accuracy in the built structure, feedback and adjustment mechanisms may be employed that sense the actual conditions of the joints and other previously applied materials, as distinguished from the ideal designed conditions of the joints and previously applied material. Since deflection, material creep, wind, temperature, and other real world conditions will affect the previously extruded areas, methods to dynamically adjust the motion and extrusion parameters to accommodate these factors may be employed to increase the accuracy of the end result. Some of the methods may include range finding, optical feedback, motion sensing, photogrammetry, motion capture, sonar, lidar, among other feedback mechanisms.

Motion Methods

Figure 22:
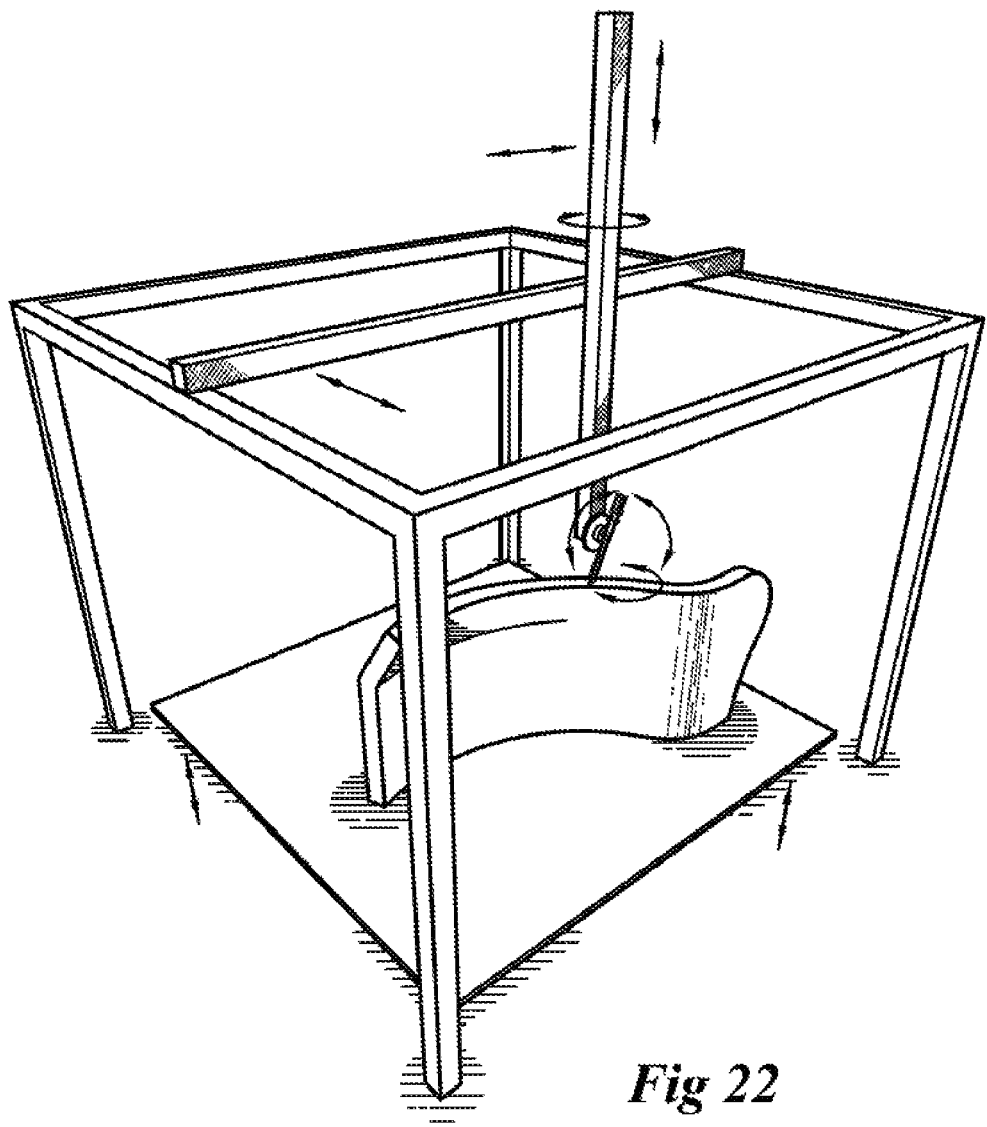
FIG. 22 is a perspective view of an object being constructed with a movement mechanism capable of multiple degrees of motion.
Figure 23:
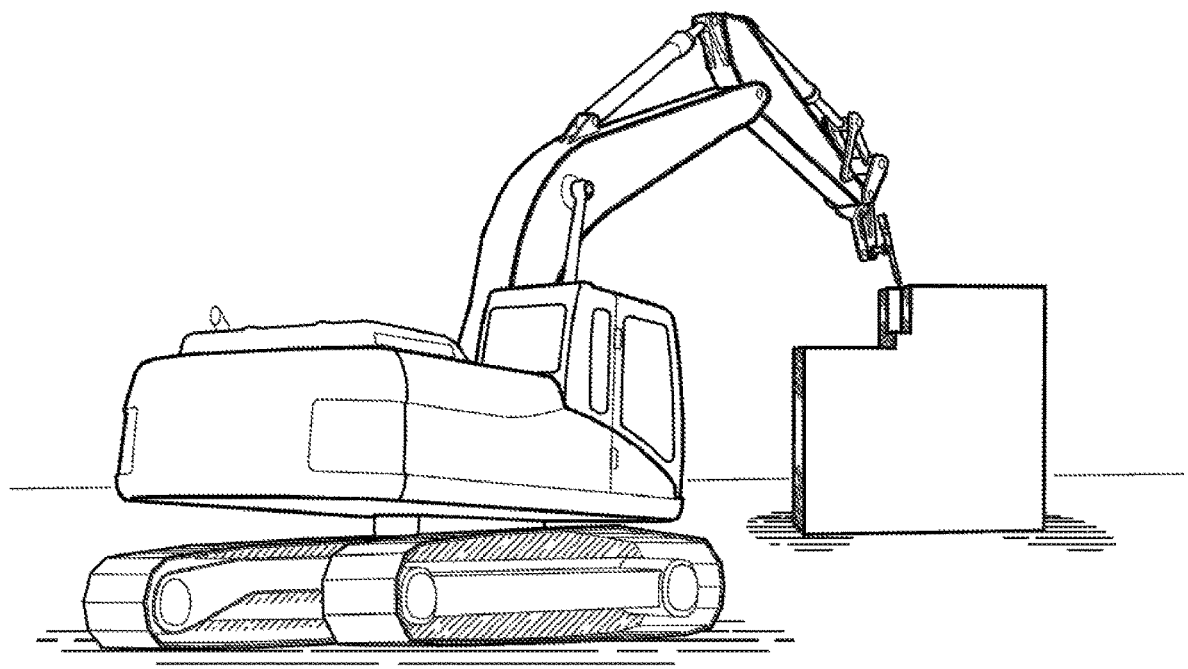
FIG. 23 depicts a mobile platform for manipulating an extruder.
Figure 24:
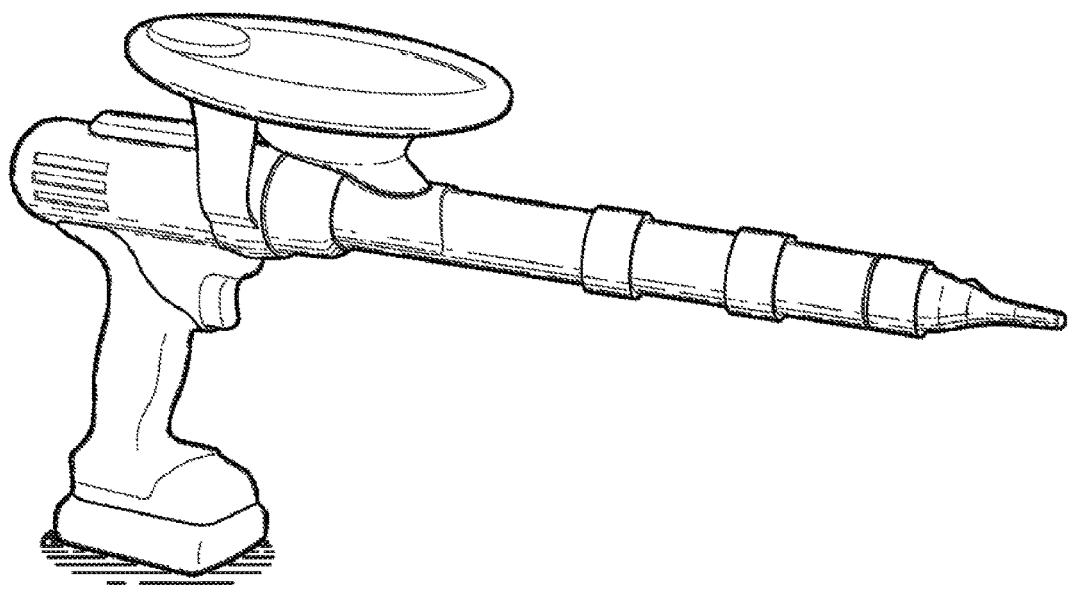
FIG. 24 depicts a hand-held embodiment of an extruder of this invention.

As shown in the drawings, alternative methods for moving the extruder may be employed. These may include, without limitation, a gantry system, CNC system, or traditional 3D printers with additional axes of control as illustrated in FIG. 22, hydraulic equipment as depicted in FIG. 23, or handheld versions of the extruder as shown in FIG. 24.

The explained above, purpose for the extruder and the movement mechanism is to connect points to create a pathway along which material is deposited. Each pathway is added to others to finally create the cellular matrix which makes up the internal structure of the final building or object.

Cellular Matrix

The cellular matrix is created by a applying a given cellular pattern to the internal volume of a solid as illustrated with the examples of FIGS. 25-30. The cellular pattern may be self-repeating or may be different from one cell or group of cells to another. Idealized versions of the structures of molecules, plant, animal, or human cells, minerals, foams, naturally occurring patterns, mathematical formulae, polyhedral, space frames, trusses or other patterns may be used to modularize the internal volume of the overall structure. The purpose of the cellular matrix is to create a balance between material used, space occupied, and strength derived from a certain pattern. The material, diameter, shape, and length of each extruded segment will determine the density of the cellular matrix. As with natural cellular constructions, various qualities may be modulated to achieve various results but may include structures to add strength, separation, flexibility, openness, rigidity, and specificity of function among other beneficial qualities.

In addition to the above-described and illustrated methods of construction of the cellular matrix, there are other methods of fabricating the cellular matrix that do not include extrusion, but may produce substantially similar end results. For instance, crystallizing foam, growing organic structures, the drying process within a medium, modular bricks, connected faces of a panelized structure or using conventional additive manufacturing to make the structures specified in this patent.

Added Materials

The strength and durability of a structure may be a function of the extruded material alone, but additional benefits may be realized by utilizing the cellular matrix as a scaffold onto which other materials are applied to fill the voids between the individual segments. Similar to a living cellular structure, the cell walls alone provide some strength, but in most cases without the internal volume filling material, the structure would not hold up. Like the water pressure in human bodies, calcification in bones, or turgor pressure in plants, the material filling the cells provides additional strength for structural support. In one aspect of the present invention, a similar method of construction utilizes material filling the cellular matrix to additionally strengthen the overall structure.

Other methods to combine materials with the cellular matrix may be used such as attachment of materials to the exterior faces or that grow into the voids of the structure.

Walls & Buildings

Figure 31:
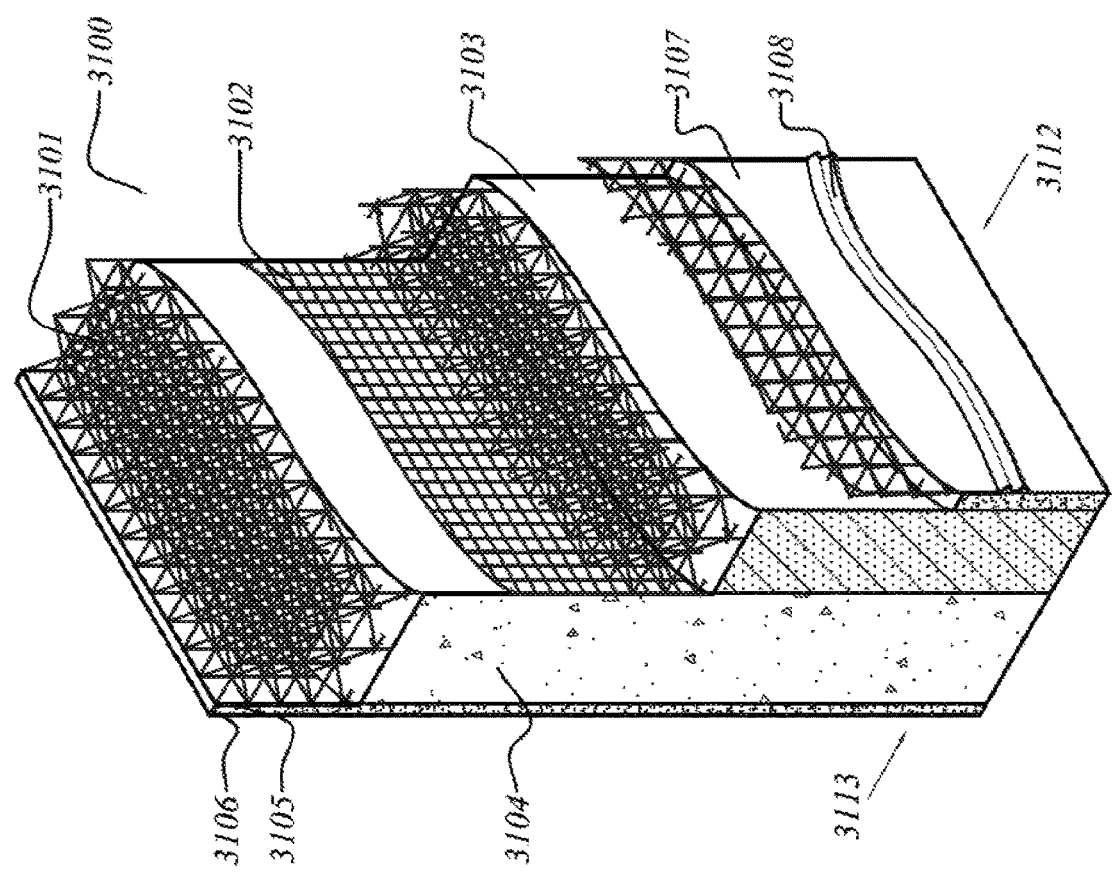
FIG. 31 is a schematic perspective view of a structure of an embodiment of this invention.

In a structure used as a building, one method for filling the cellular matrix may be described with reference to FIG. 31, where the internal structure 3101 of a wall 3100 includes a septum layer 3102 that separates one area of the wall from the other areas. Multiple septums 3102 may be utilized, but in this example one septum layer 3102 is used. Spray foam insulation is applied from the interior side 3112 of the wall and is stopped by the septum layer 3102 from penetrating further into the wall assembly. The spray foam 3103 fills a depth determined by reference to the R-value desired from the wall assembly 3100.

The next step is the application of concrete 3104 from the exterior side 3113 by means of a shotcrete, pumping or other appropriate application mechanism or technique. Concrete 3104 may be applied so that the entire matrix 3101 is filled with concrete 3104 and then finished or the concrete 3104 may be applied in a thickness that leaves the exterior face grid 3105 partially exposed. A stucco finish 3106 may then be applied using the outer face 3105 of the cellular matrix as lathe to which the stucco is secured. Other exterior finishes may also be utilized that are attached to the concrete 3104 and grid 3105 utilizing existing or yet to be developed construction practices and products. Once the concrete 3104 cures, it may serve as a significant structural element of the building, as is common in thin shell concrete construction. In this case, however, the cellular matrix 3101 is acting as both a form and part of the tensile reinforcement of the concrete. After sufficient curing of the concrete 3104, spray applied gypsum 3107 may be applied to the interior face 3112 of the structure, struck off with a tool, sanded smooth, and finished as is common with other interior wall finishes. Numerous other interior surface finishes may also be used.

Certain areas or portions 3108 of the cellular matrix may be extruded in a solid fashion to create decorative trim elements 3108, joints, or to help integrate other fixtures or equipment into the wall assembly. Conduit, raceways, wiring, airways, and pipes may be either printed in situ or integrated after the concrete cures. If completed after the concrete cures, spaces may be routed out in the foam 3103, and normal conduit/piping may be placed in the routed voids and then reinsulated, if desired, prior to the application of the interior finish.

One optional method to increase the strength of the structure is to apply a sprayed reinforcing material that coats the outer surfaces of the extrudate and begins to build up at joints to round out and reinforce the cellular matrix. The sprayed reinforcing material may provide a rigid sheath around the extrudate, adding strength without adding substantial weight. This reinforcement technique could be analogized to the calcification method that certain microscopic sea creatures use to build their skeletons.

The addition of materials to the cellular matrix may be accomplished with conventional normal manual processes, may be automated by utilizing the movement mechanisms described here or by any other techniques that accomplish the desired addition of materials to the matrix.

Scale and Utilization

The building construction examples described here are merely exemplary; myriad other uses are possible, including, without limitation, use in the fields of building construction, manufacturing, agriculture, automotive, aerospace, fashion, three-dimensional printing, furniture, and medicine among many others. The scale in the construction industry may be between ½" to 6" or greater per segment. Smaller scale segments may be as small as those produced by skipping layers on a 3D printer on the order of 0.002". Larger scale structures may incorporate volumes and spans as great as several feet or more. The spans possible and desirable depend on material properties, extrudate section properties, and segment shape.

A small device may be built with the techniques described here. For instance, an object with hollow interior voids may be fabricated and the exterior coated with porcelain enamel to form a coffee cup. A larger scale example might be the internal wall structure of an airliner where the exterior skin is fitted over a cellular matrix with an internal space made up of insulation, an airtight pressure vessel membrane, and interior finishes.

Figure 32:
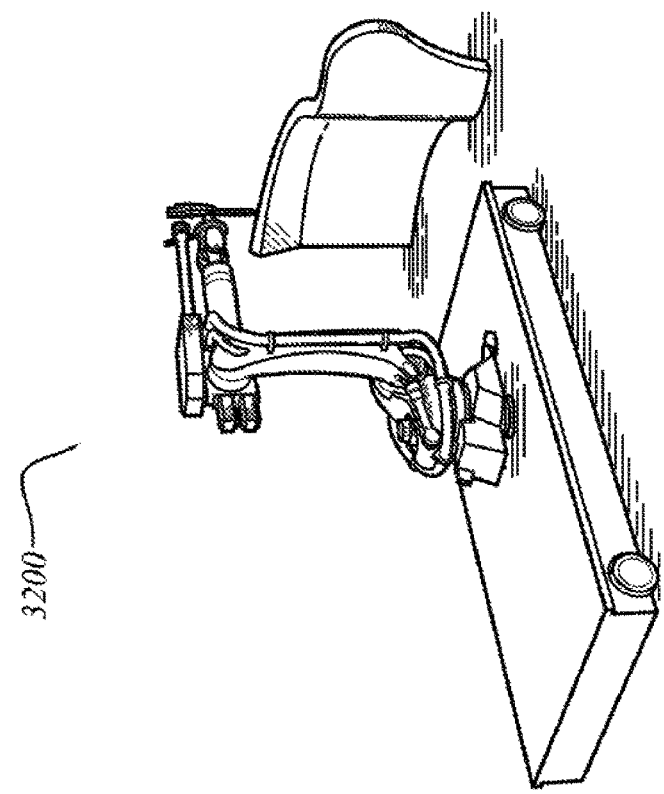
FIG. 32 is an isometric view is a mobile platform in use in accordance with an embodiment of this invention forming a wall structure.

With the robotic armature or other motion mechanisms, additional scale and motion flexibility may be gained by mounting the mechanism on a rail system that allows for a greater degree of motion. A more flexible method may be enabled by mounting a robotic arm on a mobile platform to produce a robotically controlled platform 3200 that has infinite range of motion as shown in FIG. 32.

Logic Flow

Figure 33:
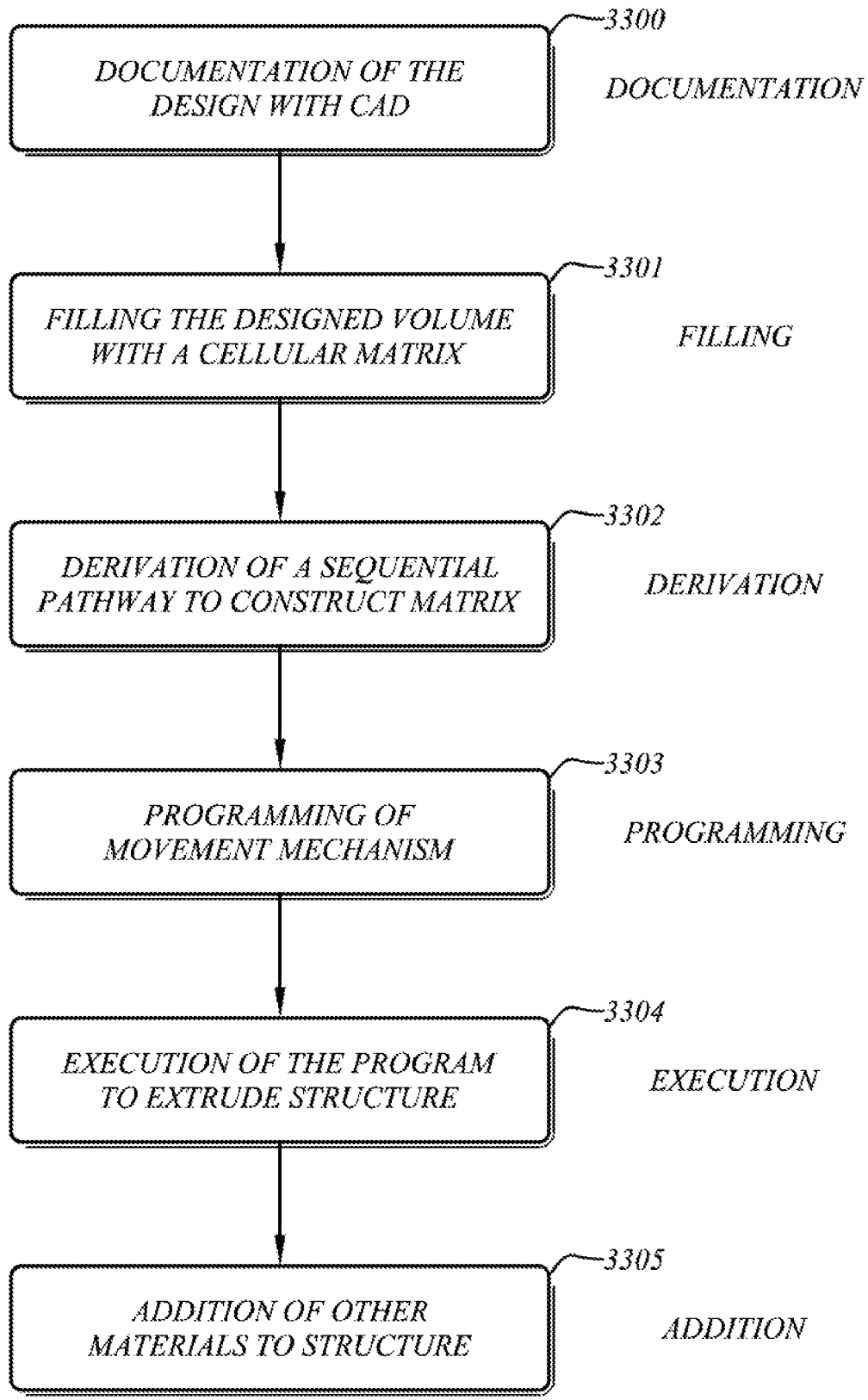
FIG. 33 depicts steps of an exemplary method of this invention.

FIG. 33 is a logic flow diagram. This is a basic, exemplary overview of steps that may be taken to produce a given structure. Numerous substitutions, alterations, modifications, omissions and the like may be possible and desirable depending on the nature of the structure being fabricated and the materials being used. In the method of FIG. 33:

An object or structure is conceived and documented preferably with a CAD program in step 3300.

This design's volume is filled with a cellular matrix having desirable properties for the final structure in step 3301.

A sequential pathway tracing each segment of the matrix is derived in step 3302.

The movement mechanism is programmed with this sequential motion pathway in step 3303. Additional information relating to speeds, temperatures, stop/start, flow, and other properties may be input with the programming.

The program is executed, inducing motion and extrusion to create the structure in step 3304.

Once portions or the whole is complete, other materials may be added to the structure in step 3305.

Different arrangements of the components and activities depicted in the drawings or described above, as well as components and steps not shown or described are possible. Similarly, some features and subcombinations are useful and may be employed without reference to other features and subcombinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

The invention claimed is:

1. A process for fabricating a structure, the process comprising:
   extruding a three-dimensional cellular matrix using a multi-axis extrusion system;
   the multi-axis extrusion system comprising an extruder head and a multi-axis movement device configured to move the extruder head along at least one multi-directional, three-dimensional sequential pathway while extruding a plurality of segments of the matrix and sequentially joining at least some of the segments to one another at a plurality of joints with the segments being self-supporting between the joints during extrusion;
   wherein the multi-axis extrusion system extrudes the plurality of segments and forms the plurality of joints into a space frame configuration for the cellular matrix comprising at least one of a plurality of hexahedron cells and a plurality of tetrahedron cells;
   wherein the at least one pathway defines an additive process in which segments of the cellular matrix are extruded to connect to previously extruded segments of the cellular matrix.

2. The process of claim 1, wherein the multi-axis extrusion system extrudes at least one of a thermoplastic or thermoset plastic material.

3. The process of claim 2, wherein the extruded thermoplastic or thermoset plastic material further comprises fiber reinforcements.

4. The process of claim 1, wherein the multi-axis extrusion system locates some of the joints in an interior portion of the cellular matrix.

5. The process of claim 4, wherein at least some of the joints located in the interior portion of the cellular matrix are located at intersections of at least three extruded segments extending from the joint in at least three different directions.

6. The process of claim 1, wherein the multi-axis extrusion system extrudes the plurality of segments and forms the plurality of joints into a space frame configuration for the cellular matrix comprising hexahedron cells that include extruded segments extending diagonally between two non-adjacent joints of a side of the hexahedron cell.

7. A process for fabricating a structure, the process comprising:
   extruding a three-dimensional cellular matrix using a multi-axis extrusion system;
   the multi-axis extrusion system comprising an extruder head and a multi-axis robotic arm configured to move the extruder head along at least one multi-directional, three-dimensional sequential pathway while extruding a plurality of segments of the matrix and sequentially joining at least some of the segments to one another at a plurality of joints;
   wherein the multi-axis extrusion system extrudes the plurality of segments and forms the plurality of joints in a space frame configuration for the cellular matrix;
   wherein the at least one pathway defines an additive process in which segments of the cellular matrix are extruded to connect to previously extruded segments of the cellular matrix;
   wherein the extruded segments are self-supporting between joints during the fabrication process.

8. The process of claim 7, wherein the multi-axis extrusion system extrudes a three-dimensional cellular matrix comprising a plurality of cells that are not uniform in geometry throughout the entire cellular matrix.

9. The process of claim 8, wherein the multi-axis extrusion system forms cells in a first region of the matrix with a first geometry and forms cells in a second region of the matrix with a second geometry that is different from the first geometry.

10. The process of claim 9, wherein the first region is configured to withstand a higher stress than the second region.

11. The process of claim 7, further comprising introducing a filler material into at least a portion of the cellular matrix.

12. The process of claim 11, further comprising covering an outer face of the cellular matrix with a finish layer.

13. The process of claim 12, further comprising attaching decorative elements to the structure.

14. The process of claim 7, wherein the cellular matrix is self-supporting during the extrusion process.

15. The process of claim 7, further comprising introducing a first type of filler material into one portion of the cellular matrix and introducing a second type of filler material into another portion of the cellular matrix, the first and second types of filler material being different materials.

16. The process of claim 7, wherein the multi-axis extrusion system further comprises at least one controller configured to control the movement of the extruder head along the at least one sequential pathway.

17. The process of claim 16, wherein the at least one sequential pathway is derived from acellular matrix pattern applied to a design for the structure to be fabricated.

18. The process of claim 17, wherein the cellular matrix pattern at least partially fills a three-dimensional geometry of the design for the structure to be fabricated.

19. The process of claim 16, wherein the at least one pathway is a plurality of sequential pathways.

20. The process of claim 16, wherein the controller changes at least one operational parameter during extrusion of the plurality of segments.

21. The process of claim 20, wherein the at least one operational parameter comprises at least one of a motion speed parameter, an extrusion speed parameter, an extrusion temperature parameter, and a coolant flow parameter.

22. The process of claim 21, wherein the controller changes the at least one operational parameter based on a pre-programmed change.

23. The process of claim 21, wherein the controller changes the at least one operational parameter in response to a sensed condition of a portion of the extruded three-dimensional cellular matrix.

24. The process of claim 20, wherein the controller is configured to adjust a solidity characteristic of material extruded by the extruder head during extrusion of the plurality of segments.

25. The process of claim 7, wherein the multi-axis extrusion system extrudes the plurality of segments and forms the plurality of joints into a space frame configuration for the cellular matrix comprising at least one of a plurality of hexahedron cells and a plurality of tetrahedron cells.

26. The process of claim 25, wherein the multi-axis extrusion system extrudes the plurality of segments and forms the plurality of joints into a space frame configuration for the cellular matrix comprising hexahedron cells that include extruded segments extending diagonally between two non-adjacent joints of a side of the hexahedron cell.

27. A process for fabricating a structure, the process comprising:
extruding a three-dimensional cellular matrix using a multi-axis extrusion system;
the multi-axis extrusion system comprising: (i) an extruder head, (ii) a multi-axis movement device configured to move the extruder head along at least one multi-directional, three-dimensional pathway to extrude a plurality of segments of the matrix and join at least some of the segments to one another at a plurality of joints, with the extruded segments being self-supporting between the joints, and (iii) at least one controller configured to control the extruder head and the multi-axis movement device;
wherein, during extrusion of the three-dimensional cellular matrix, the controller receives feedback on a condition of a portion of the cellular matrix and adjusts one or more parameters of at least one of the extruder head and the multi-axis movement device in response to the feedback.

28. The process of claim 27, wherein, during extrusion of the three-dimensional cellular matrix, the controller receives feedback from at least one sensor on a condition of at least one joint of the cellular matrix.

29. The process of claim 27, wherein, during extrusion of the three-dimensional cellular matrix, the controller receives feedback on an actual condition of the portion of the cellular matrix relative to a designed condition of the portion of the cellular matrix.

30. The process of claim 27, wherein the controller is configured to adjust at least one of an extrusion speed and a coolant flow in response to the feedback.

31. The process of claim 27, wherein the controller is configured to adjust a solidity characteristic of material extruded by the extruder head in response to the feedback.

32. The process of claim 27, wherein the extruder head heats a material prior to extrusion, wherein the process further comprises flowing a coolant at least partially along a pathway of the heated material.

33. The process of claim 32, wherein at least a portion of the coolant flow along the pathway of the heated material is within an extrusion nozzle of the extruder head.

34. The process of claim 33, wherein the coolant also flows along the heated material after extrusion from the nozzle.

35. The process of claim 34, wherein the coolant flow outside of the nozzle is aligned with an extrusion direction of the heated material.

36. The process of claim 34, wherein the coolant flow outside of the nozzle is parallel to an extrusion direction of the heated material.

37. The process of claim 32, wherein flowing the coolant comprises flowing the coolant along a recirculating pathway.

38. The process of claim 32, wherein flowing the coolant comprises flowing the coolant along a non-recirculating pathway.

39. A process for frabricating a cellular matrix, the matrix comprising a plurality of cells, the cells comprising segments connected at joints, the joints located at corners of the cells, some of the joints located in an interior area of the cellular matrix, the process using an extruder nozzle mounted on a multi-axis robotic armature, the process comprising:
using the multi-axis robotic armature, moving the extruder nozzle along a sequential pathway while extruding the segments of the cellular matrix such that during fabrication the extruded segments of the cellular matrix are self-supporting between the joints;
wherein the process extrudes the plurality of segments and forms the plurality of joints into a space frame configuration for the cellular matrix comprising at leat one of a plurality of hexahedron cells and a plurality of tetrehedron cells.

40. The process of claim 1, wherein the extrusion system extrudes some of the segments along parts of the pathway that are non-horizontal.

41. The process of claim 27, wherein the extrusion system extrudes some of the segments along parts of the pathway that are non-horizontal.

42. The proces of claim 39, wherein the extruder nozzle extrudes some of the segments along parts of the pathway that are non-horizontal.

* * * * *